(12) United States Patent
Burn

(10) Patent No.: US 8,038,073 B2
(45) Date of Patent: Oct. 18, 2011

(54) TAMPER DETECTION OF DOCUMENTS USING ENCODED DOTS

(75) Inventor: Peter Burn, Hornsby (AU)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 11/956,919

(22) Filed: Dec. 14, 2007

(65) Prior Publication Data

US 2008/0164328 A1    Jul. 10, 2008

(30) Foreign Application Priority Data

Dec. 22, 2006  (AU) .................................. 2006252223

(51) Int. Cl.
G06K 19/06  (2006.01)
(52) U.S. Cl. ....................................................... 235/494
(58) Field of Classification Search .................. 235/494, 235/487, 454, 493; 283/93
See application file for complete search history.

(56) References Cited

U.S. PATENT DOCUMENTS

| 3,862,501 | A | * | 1/1975 | Jemseby et al. ................. 380/54 |
| 5,984,366 | A | * | 11/1999 | Priddy ............................. 283/72 |
| 7,131,776 | B2 |  | 11/2006 | Aoshima et al. ................ 400/76 |
| 7,175,095 | B2 | * | 2/2007 | Pettersson et al. ............. 235/494 |
| 7,225,991 | B2 | * | 6/2007 | Jones et al. .................... 235/487 |
| 2003/0066896 | A1 |  | 4/2003 | Pettersson et al. |
| 2003/0098357 | A1 | * | 5/2003 | Cummings et al. ............ 235/494 |
| 2005/0226666 | A1 |  | 10/2005 | Aoshima et al. ................. 400/76 |
| 2005/0269416 | A1 | * | 12/2005 | Sussmeier et al. ............ 235/494 |
| 2006/0159304 | A1 |  | 7/2006 | Sharma |
| 2008/0130945 | A1 | * | 6/2008 | Rhoads et al. ................. 382/100 |

FOREIGN PATENT DOCUMENTS

| JP | 2001-169091 | 6/2001 |
| JP | 2003-264685 | 9/2003 |
| JP | 2005-210464 | 8/2005 |
| JP | 2005-297373 A | 10/2005 |
| JP | 2006-141064 | 6/2006 |
| JP | 2006-157831 A | 6/2006 |
| WO | WO 02/087129 | 10/2002 |
| WO | 2006/059681 | 8/2006 |

* cited by examiner

*Primary Examiner* — Daniel Hess
*Assistant Examiner* — Tabitha Chedekel
(74) *Attorney, Agent, or Firm* — Fitzpatrick, Cella, Harper & Scinto

(57) ABSTRACT

Disclosed are arrangements encode protection marks (302) into an unprotected document, where the protection marks are modulated according to a attributes of corresponding areas (902) of the unprotected document associated with the protection marks (302). Unauthorized amendment of the protected document can be detected by demodulating (1107) the modulated protection marks in the protected document, to derive the attribute of the unprotected document. This is compared to the corresponding attribute of the protected document, and this comparison indicates if unauthorized amendment has taken place.

17 Claims, 16 Drawing Sheets

THIS PAGE HAS BEEN LEFT INTENTIONALLY BLANK

Fig. 2

TAMPER DETECTION OF DOCUMENTS USING ENCODED DOTS

FIELD OF THE INVENTION

The present invention relates generally to documents and, in particular, to document protection. The present invention also relates to a method and apparatus for generating, printing and reading protected documents, and to a computer program product including a computer readable medium having recorded thereon a computer program for generating, printing and reading protected documents.

BACKGROUND

It is often desirable to ensure that a printed document has not been altered or tampered with in some unauthorised manner from the time the document was first printed. For example, a contract that has been agreed upon and signed on some date may subsequently be fraudulently altered. It is desirable to be able to detect such alterations in detail. Similarly, security documents of various sorts including cheques and monetary instruments record values, which are vulnerable to fraudulent alteration. Detection of any fraudulent alteration in such document is also desirable. Further, it is desirable that such detection be performed automatically, and that the detection reveal the nature of any alteration.

In addition to detection of fraudulent alteration or tampering with a document, it is desirable that printed documents offer a visible deterrent to fraudulent alteration.

Various methods of deterring and detecting fraudulent alteration to documents have been proposed and used.

One class of methods that was in use before high quality color scanners and printers became commonly available, was to print important information such as monetary amounts in special fonts or with special shadows that were, at the time, difficult to reproduce. However, with modern printers and scanners, such techniques have become vulnerable to attack.

One known method of detecting alteration of a document uses a two dimensional (2D) barcode printed on one part of a document page to encode (possibly cryptographically) a representation of some other portion of the document, such as a signature area. This 2D barcode can be decoded and a resulting image compared by an operator to the area the barcode is intending to represent to check for similarity. Existing variants of such barcode protection may be divided into two categories.

The first category of 2D-barcode protection involves embedding a portion of a document's semantic information into a 2D barcode. Often, such semantic information may be hashed and encrypted. However, this first category of barcode protection does not allow non-textual documents to be protected. The second category of 2D-barcode protection treats a document as an image and embeds a portion of the image in a barcode. However, embedding a portion of the image in the barcode may cause the barcode to become very large. In this instance, automatic verification at a fine granularity is not possible, as the image embedded in the barcode cannot be automatically lined up with the received document.

A related body of work is detection of tampering in digital images that are not subject to print/scan cycles. In this regard a number of "fragile watermark" methods are known. However, these methods are generally not applicable to tamper detection in printed documents since they cannot withstand the introduction of noise, Rotation, Scaling and Translation (RST), re-sampling, and local distortion that occurs in a print/scan cycle. Some of these fragile watermark methods operate by replacing all or some of the least significant bits of pixels of an image with some form of checksum of remaining bits in each pixel.

A number of "semi-fragile watermark" methods are also known. These include methods that use cross-correlation to detect the presence of a lightly embedded shifted copy of a portion of an image. Another known semi-fragile watermark method embeds watermarks into image blocks, and then compares the detection strength of these watermarks to discern if any blocks have been altered. These semi-fragile watermark methods tend to have less localisation ability as their detection ability improves, and as their localisation ability improves, these methods become more sensitive to noise and other distortions and so cannot be used to detect local changes in printed documents.

Other known methods of detecting alterations in digital images use special materials to make alteration difficult. Such methods include laminates covering the printed surface of a document where damage to the laminate is obvious. However using special materials introduces production complexity, and is not applicable to plain paper applications. These known methods are also not amenable to automatic detection.

An additional failing in many existing methods is weak cryptographic security. In many cases, once the cryptographic algorithm being employed is identified, identification leads directly to a subversion method to attack the identified method.

Another common failing of present methods of detecting alterations to digital images is the distribution of alteration detection information over wide areas of a page, or even areas completely separate to the image area to be authenticated (as in the barcode method above). This introduces problems if there is incidental soiling of the document in areas apart from the image area being authenticated. Many of these methods cannot be used to authenticate the entire area of a document, so documents must be specifically designed to accommodate the methods.

A still further class of methods of detecting alterations to documents uses independent transfer of information about the original unaltered form of a document to verify the document. This could be as simple as a telephone call to a person with independent knowledge, and may extend to keeping a complete copy of the document in a secure location. Such methods have many practical disadvantages since they require handling and storage of such independent information.

SUMMARY

It is an object of the present invention to substantially overcome, or at least ameliorate, one or more disadvantages of existing arrangements.

Disclosed are arrangements, referred to as Modulated Mark Encoding (ie MME) arrangements, which seek to address the above problems by encoding protection marks into an unprotected document, where the protection marks are modulated according to an attribute of corresponding areas of the unprotected document associated with the protection marks. Unauthorised amendment of the protected document can be detected by demodulating the modulated protection marks in the protected document, and thus deriving the attribute of the unprotected document. This is compared to the corresponding attribute of the protected document, and this comparison indicated if unauthorised amendment has taken place.

According to one aspect of the present invention there is provided a method of ensuring that unauthorised changes to an unprotected document can be detected, the method comprising an encoding process and a decoding process; wherein:

the encoding process comprises the steps of:

defining an unmodulated array of protection marks, and for each protection mark in the array:

modulating an attribute of the protection mark according to a property of the unprotected document in an area associated with the protection mark; wherein the area associated with the protection mark overlaps an area associated with another protection mark in the array; and incorporating the modulated protection marks into the unprotected document to thereby form a protected document; and wherein:

the decoding process comprises the steps of:

extracting a description of the unmodulated array of protection marks from the protected document;

identifying the modulated protection marks in the protected document; and for each identified modulated protection mark;

demodulating the attribute of the modulated protection mark;

determining from the demodulated attribute the corresponding property of the unprotected document;

determining the property of the protected document in the area associated with the modulated protection mark; and comparing the determined corresponding property of the unprotected document to the determined property of the protected document.

According to another aspect of the present invention there is provided a method of encoding an unprotected document to ensure that unauthorised changes to the unprotected document can be detected, the method comprising the steps of:

defining an unmodulated array of protection marks, and for each protection mark in the array:

modulating an attribute of the protection mark according to a property of the unprotected document in an area associated with the protection mark; wherein the area associated with the protection mark overlaps an area associated with another protection mark in the array; and incorporating the modulated protection marks into the unprotected document to thereby form a protected document.

According to another aspect of the present invention there is provided a method of detecting unauthorised changes to a protected document, the method comprises the steps of:

extracting a description of an unmodulated array of protection marks from the protected document;

identifying modulated protection marks in the protected document; and for each identified modulated protection mark;

demodulating an attribute of the modulated protection mark;

determining from the demodulated attribute a corresponding property of a corresponding unprotected document;

determining the property of the protected document in an area associated with the modulated protection mark;

comparing the determined corresponding property of the unprotected document to the determined property of the protected document; and determining if unauthorised changes have been made to the protected document dependent upon the comparing step.

According to another aspect of the present invention there is provided a system for ensuring that unauthorised changes to an unprotected document can be detected, the system comprising an encoding sub-system and a decoding sub-system, wherein:

said encoding sub-system comprises:

a memory for storing a program; and a processor for executing the program, said program comprising:

code for defining an unmodulated array of protection marks, and for each protection mark in the array:

code for modulating an attribute of the protection mark according to a property of the unprotected document in an area associated with the protection mark; wherein the area associated with the protection mark overlaps an area associated with another protection mark in the array; and code for incorporating the modulated protection marks into the unprotected document to thereby form a protected document; and wherein:

the decoding sub-system comprises:

a memory for storing a program; and a processor for executing the program, said program comprising:

code for extracting a description of the unmodulated array of protection marks from the protected document;

code for identifying the modulated protection marks in the protected document; and for each identified modulated protection mark;

code for demodulating the attribute of the modulated protection mark;

code for determining from the demodulated attribute the corresponding property of the unprotected document;

code for determining the property of the protected document in the area associated with the modulated protection mark; and code for comparing the determined corresponding property of the unprotected document to the determined property of the protected document.

According to another aspect of the present invention there is provided a encoding sub-system for a system for ensuring that unauthorised changes to an unprotected document can be detected, the system comprising an encoding sub-system and a decoding sub-system, wherein said encoding sub-system comprises:

a memory for storing a program; and a processor for executing the program, said program comprising:

code for defining an unmodulated array of protection marks, and for each protection mark in the array:

code for modulating an attribute of the protection mark according to a property of the unprotected document in an area associated with the protection mark; wherein the area associated with the protection mark overlaps an area associated with another protection mark in the array; and code for incorporating the modulated protection marks into the unprotected document to thereby form a protected document.

According to another aspect of the present invention there is provided a decoding sub-system for detecting unauthorised changes to a protected document, the sub-system comprising:

a memory for storing a program; and a processor for executing the program, said program comprising:

code for extracting a description of an unmodulated array of protection marks from the protected document;

code for identifying modulated protection marks in the protected document; and for each identified modulated protection mark;

code for demodulating an attribute of the modulated protection mark;

code for determining from the demodulated attribute a corresponding property of a corresponding unprotected document;

code for determining the property of the protected document in an area associated with the modulated protection mark;

code for comparing the determined corresponding property of the unprotected document to the determined property of the protected document; and code for determining if unauthorised changes have been made to the protected document dependent upon the comparing step.

According to another aspect of the present invention there is provided a computer program product including a computer readable medium having recorded thereon a computer program for directing a processor to execute a method for ensuring that unauthorised changes to an unprotected document can be detected, the program comprising, in relation to an encoding sub-system:

code for defining an unmodulated array of protection marks, and for each protection mark in the array:

code for modulating an attribute of the protection mark according to a property of the unprotected document in an area associated with the protection mark; wherein the area associated with the protection mark overlaps an area associated with another protection mark in the array; and code for incorporating the modulated protection marks into the unprotected document to thereby form a protected document; and wherein the program comprises in relation to a decoding sub-system:

code for extracting a description of the unmodulated array of protection marks from the protected document;

code for identifying the modulated protection marks in the protected document; and for each identified modulated protection mark;

code for demodulating the attribute of the modulated protection mark;

code for determining from the demodulated attribute the corresponding property of the unprotected document;

code for determining the property of the protected document in the area associated with the modulated protection mark; and code for comparing the determined corresponding property of the unprotected document to the determined property of the protected document.

According to another aspect of the present invention there is provided a computer program product including a computer readable medium having recorded thereon a computer program for directing a processor to execute an encoding method for ensuring that unauthorised changes to an unprotected document can be detected, the program comprising:

code for defining an unmodulated array of protection marks, and for each protection mark in the array:

code for modulating an attribute of the protection mark according to a property of the unprotected document in an area associated with the protection mark; wherein the area associated with the protection mark overlaps an area associated with another protection mark in the array; and code for incorporating the modulated protection marks into the unprotected document to thereby form a protected document.

According to another aspect of the present invention there is provided a computer program product including a computer readable medium having recorded thereon a computer program for directing a processor to execute a decoding method for ensuring that unauthorised changes to an unprotected document can be detected, the program comprising:

code for extracting a description of an unmodulated array of protection marks from the protected document;

code for identifying modulated protection marks in the protected document; and for each identified modulated protection mark;

code for demodulating an attribute of the modulated protection mark;

code for determining from the demodulated attribute a corresponding property of a corresponding unprotected document;

code for determining the property of the protected document in an area associated with the modulated protection mark;

code for comparing the determined corresponding property of the unprotected document to the determined property of the protected document; and code for determining if unauthorised changes have been made to the protected document dependent upon the comparing step.

Other aspects of the invention are also disclosed.

BRIEF DESCRIPTION OF THE DRAWINGS

At least one embodiment of the present invention will now be described with reference to the drawings, in which:

FIG. 2 has been left intentionally blank

DETAILED DESCRIPTION INCLUDING BEST MODE

Figure 1:
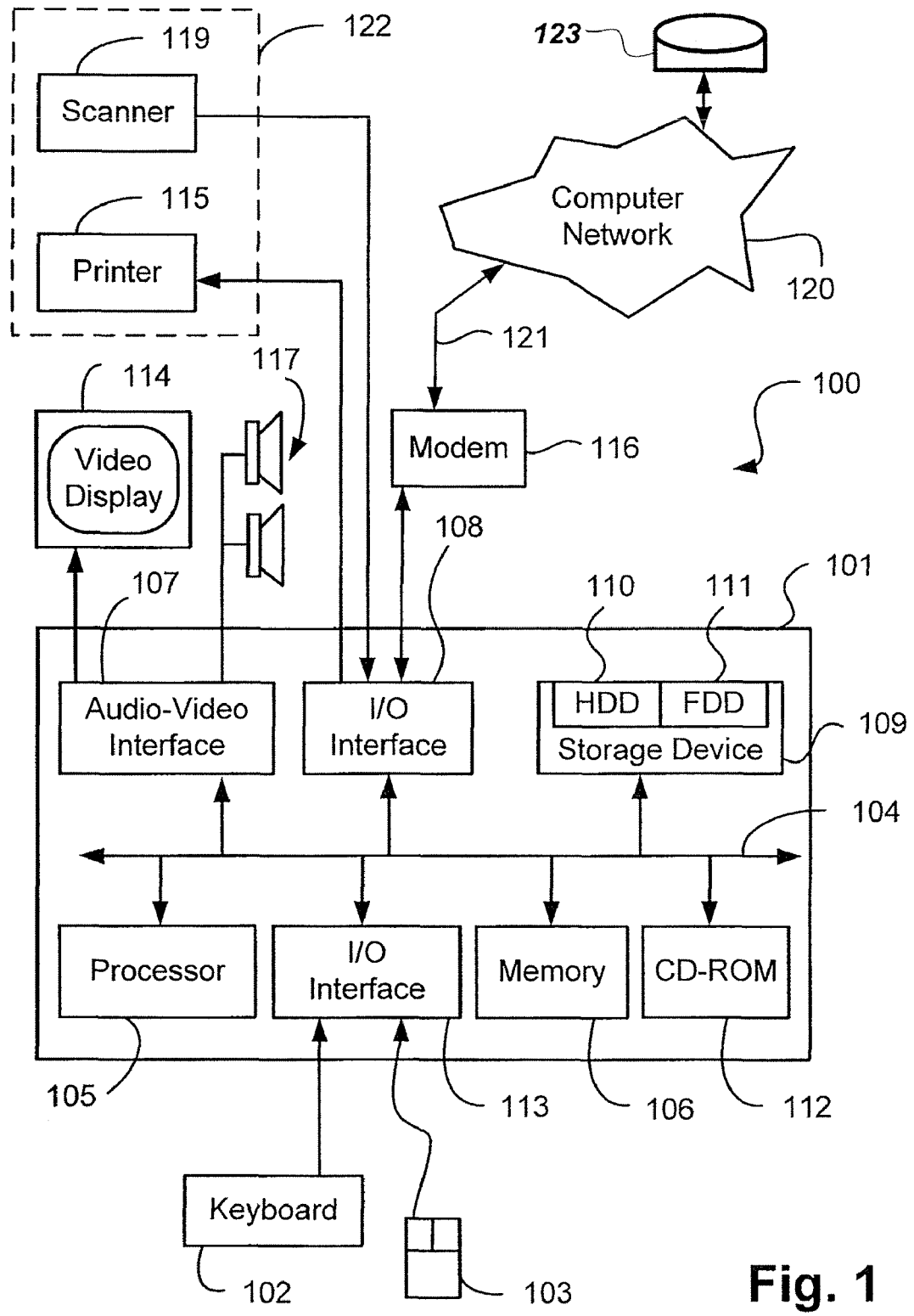
FIG. 1 is a schematic block diagram of a general-purpose computer upon which arrangements described may be practiced.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of devices that form public knowledge through their respective use. Such discussions should not be interpreted as a representation by the present inventor or patent applicant that such devices in any way form part of the common general knowledge in the art.

INTRODUCTION

System for Generating and Analysing Protected Documents

Figure 11:
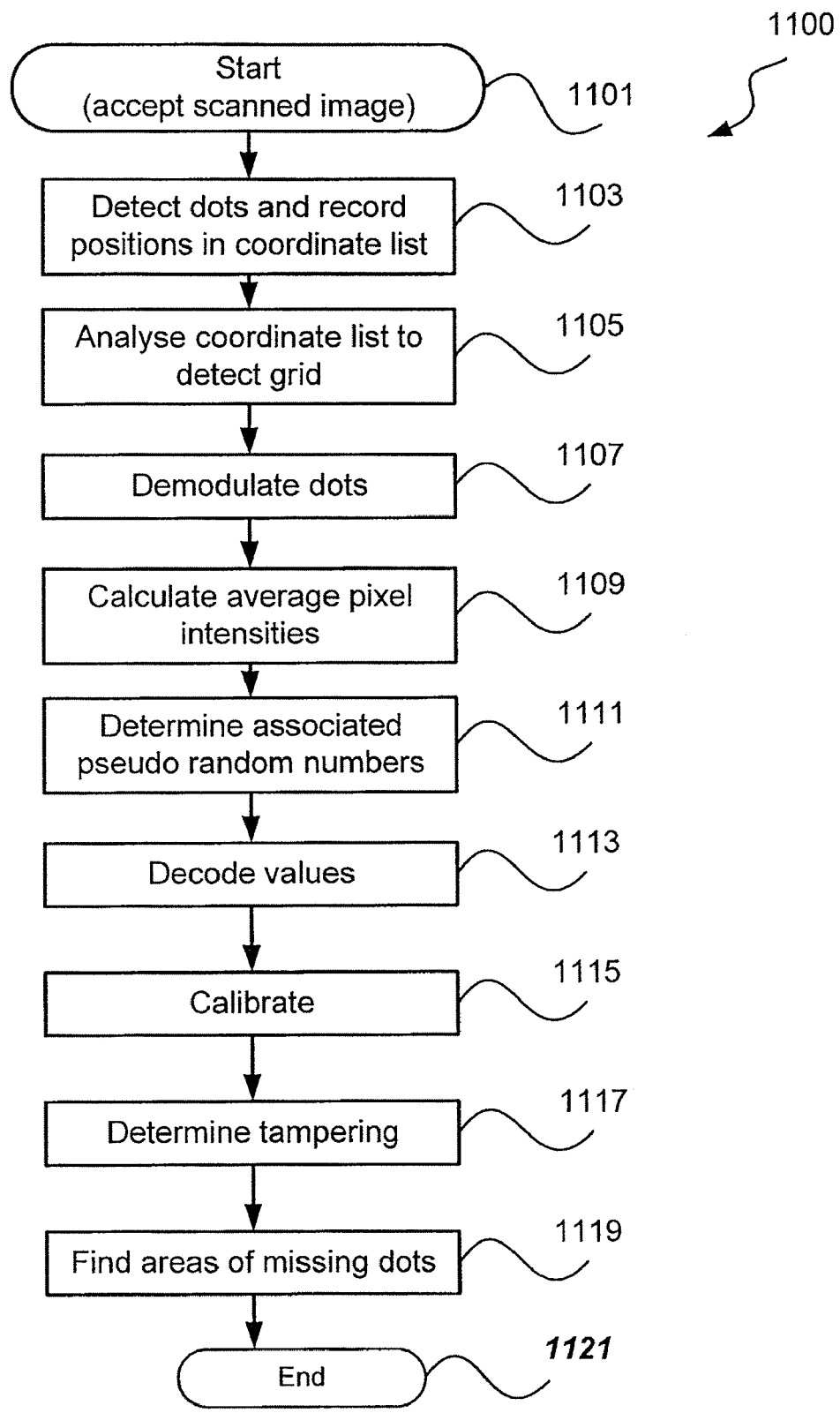
FIG. 11 is a flow diagram showing a method of verifying (ie decoding) a protected document.

The MME methods described herein may be practiced using a general-purpose computer system 100, such as that shown in FIG. 1 wherein the process of FIG. 11 may be implemented as software, such as an MME application program executing within the computer system 100. In particular, the steps of the described MME methods may be affected by instructions in the MME software that are carried out by the computer. The instructions may be formed as one or more MME code modules, each for performing one or more particular tasks. The MME software may also be divided into two separate parts, in which a first part performs the described MME methods and a second part manages a user interface between the first part and the user. The MME software may be stored in a computer readable medium, including the storage devices described below, for example. The MME software may be loaded into the computer from the computer readable medium, and then executed by the computer. A computer readable medium having such software or computer program recorded on it is a computer program product. The use of the computer program product in the computer affects an advantageous apparatus for implementing the described MME methods.

The computer system 100 is formed by a computer module 101, input devices such as a keyboard 102, mouse 103 and a scanner 119, and output devices including a printer 115, a display device 114 and loudspeakers 117. The printer 115 may be in the form of an electro-photographic printer, an ink jet printer or the like. The printer may be used to print barcodes as described below. The term "barcode" refers, in the present description, to regions of a document to which the disclosed MME arrangements have been applied. The scanner 119 may be in the form of a flatbed scanner, for example, which may be used to scan a barcode in order to generate a scanned image of the barcode. The scanner 119 may be configured, as depicted by a dashed rectangle 122, within the chassis of a multi-function printer.

A Modulator-Demodulator (Modem) transceiver device 116 may be used by the computer module 101 for communicating to and from an external server 123 over a communications network 120, for example, connectable via a telephone line 121 or other functional medium. The modem 116 may be used to obtain access to the external server 123 over the Internet and other network systems, such as a Local Area Network (LAN) or a Wide Area Network (WAN), and may be incorporated into the computer module 101 in some implementations. In one implementation, the printer 115 and/or scanner 119 may be connected to the computer module 101 via such communication networks.

The computer module 101 typically includes at least one processor unit 105, and a memory unit 106, for example formed from semiconductor random access memory (RAM) and read only memory (ROM). The module 101 also includes a number of input/output (I/O) interfaces. These I/O interfaces include an audio-video interface 107 that couples to the video display 114 and loudspeakers 117, an I/O interface 113 for the keyboard 102 and mouse 103 and optionally a joystick (not illustrated), and an interface 108 for the modem 116, printer 115 and scanner 119. In some implementations, the modem 116 may be incorporated within the computer module 101, for example within the interface 108. A storage device 109 may be provided and typically includes a hard disk drive 110 and a floppy disk drive 111. A magnetic tape drive (not illustrated) may also be used.

A CD-ROM drive 112 may be provided as a non-volatile source of data. The components 105 to 113 of the computer module 101, typically communicate via an interconnected bus 104 and in a manner that results in a conventional mode of operation of the computer system 100 known to those in the relevant art. Examples of computers on which the described arrangements can be practised include IBM-PC's and compatibles, Sun Sparcstations or alike computer systems evolved therefrom.

Typically, the MME application program is resident on the hard disk drive 110 and read and controlled in its execution by the processor 105. Intermediate storage of the program and any data fetched from the remote server 123 over the network 120 may be accomplished using the semiconductor memory 106, possibly in concert with the hard disk drive 110. In some instances, the MME application program may be supplied to the user encoded on a CD-ROM or floppy disk and read via the corresponding drive 112 or 111, or alternatively may be read by the user from the external server 123 over the network 120 via the modem device 116. Still further, the MME software may be loaded into the computer system 100 from other computer readable media.

The term "computer readable medium" as used herein refers to any storage or transmission medium that participates in providing instructions and/or data to the computer system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of transmission media include radio or infra-red transmission channels as well as a network connection to another computer or networked device, and the Internet or Intranets including e-mail transmissions and information recorded on Websites and the like.

The MME methods described below may alternatively be implemented in dedicated hardware such as one or more integrated circuits performing the functions or sub functions of the described MME methods. Such dedicated hardware may include graphic processors, digital signal processors, or one or more microprocessors and associated memories.

A document to be protected, as described below, may be stored in an electronic file of a file-system configured within the memory 106 or hard disk drive 110 of the computer module 101, for example. Similarly, the data read from a protected document may also be stored in the hard disk drive 110 or memory 106 upon the protected document being read. Alternatively, the document to be protected may be generated on-the-fly by a software application program, other than the MME application program, resident on the hard disk drive 110 and being controlled in its execution by the processor 105. The data read from a protected document may also be processed by such an application program. Protected documents are also referred to as encoded documents. The term "encoding" is used both in regard to establishing the state of the protection marks, and in regard to incorporating data into a protected document. The term decoding is also used in both senses, as an inverse operation.

Generating Protected Documents

The term 'protected document' refers to a document with features appended to the document that allow for tamper detection of the document.

Figure 3:
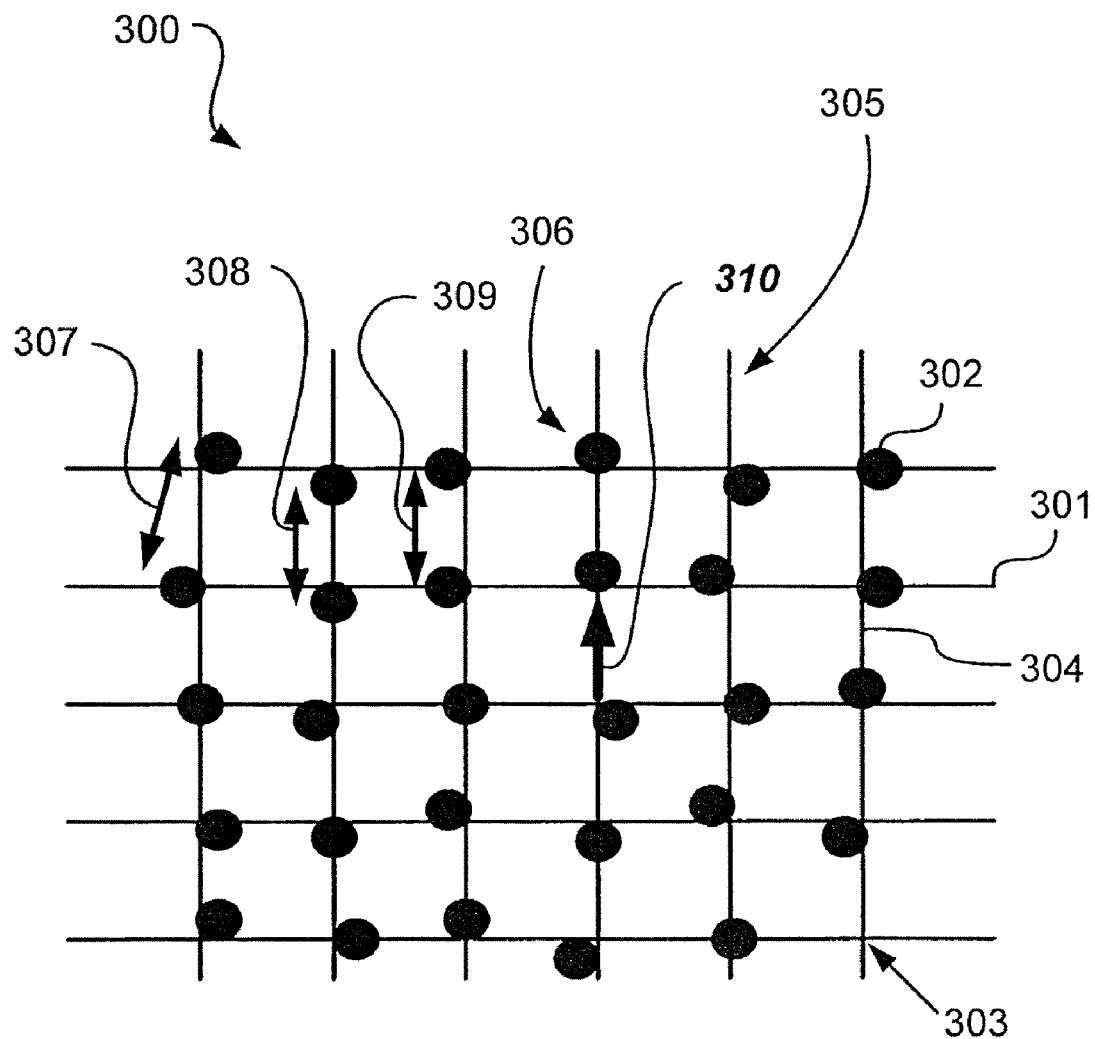
FIG. 3 shows a portion of a protected document.

FIG. 3 shows an enlarged view 300 of part of a protected document after the MME technique has been applied to an unprotected document to ensure that unauthorised changes have not been made, thus incorporating the modulated protection marks into the unprotected document. Document protection is provided using a large number of dots 302 in an array 306. These dots are referred to as protection dots or more generally as protection marks. Each protection dot 302 is located at or in the vicinity of a corresponding intersection point 303 of a regular square grid 305 formed by horizontal lines 301 and vertical lines 304. It is noted that it is the protection dots 302 that provide the protection, and not the grid 305. The grid 305 is depicted purely to provide a frame of reference for describing the location of the protection dots 302, and accordingly the grid 305 may be considered to be a "virtual" grid.

In use, the positions of the protection dots 302 in the array 306 of protection dots are spatially modulated relative to the corresponding intersection points of the grid 305. The result of this modulation, having regard to a particular protection dot, is to move the dot (such as 502 in FIG. 5) to one of a number of positions (such as 503 in FIG. 5) which are at or in the vicinity of the corresponding grid intersection point 505. The appearance of the array 306 of modulated protection dots is similar to that of a regular array of dots (ie an array of dots each of which is situated on the corresponding intersection point of an associated regular square grid), but not identical.

The example described in relation to FIG. 3 involves modulation of the position attribute of the unmodulated protection dot. Other modulation schemes can be used which relate to other attributes of the modulation dots. Thus, for example, intensity modulation of the protection dots can be used, or alternately, code based modulation using different symbols for the protection dots can be used. Furthermore, the protection marks may be visible to a person, in order to announce that the document is protected and thus deter unauthorised amendments, however the protection marks may also be invisible to a person, provided that they can be detected by a decoding system.

Figure 4:
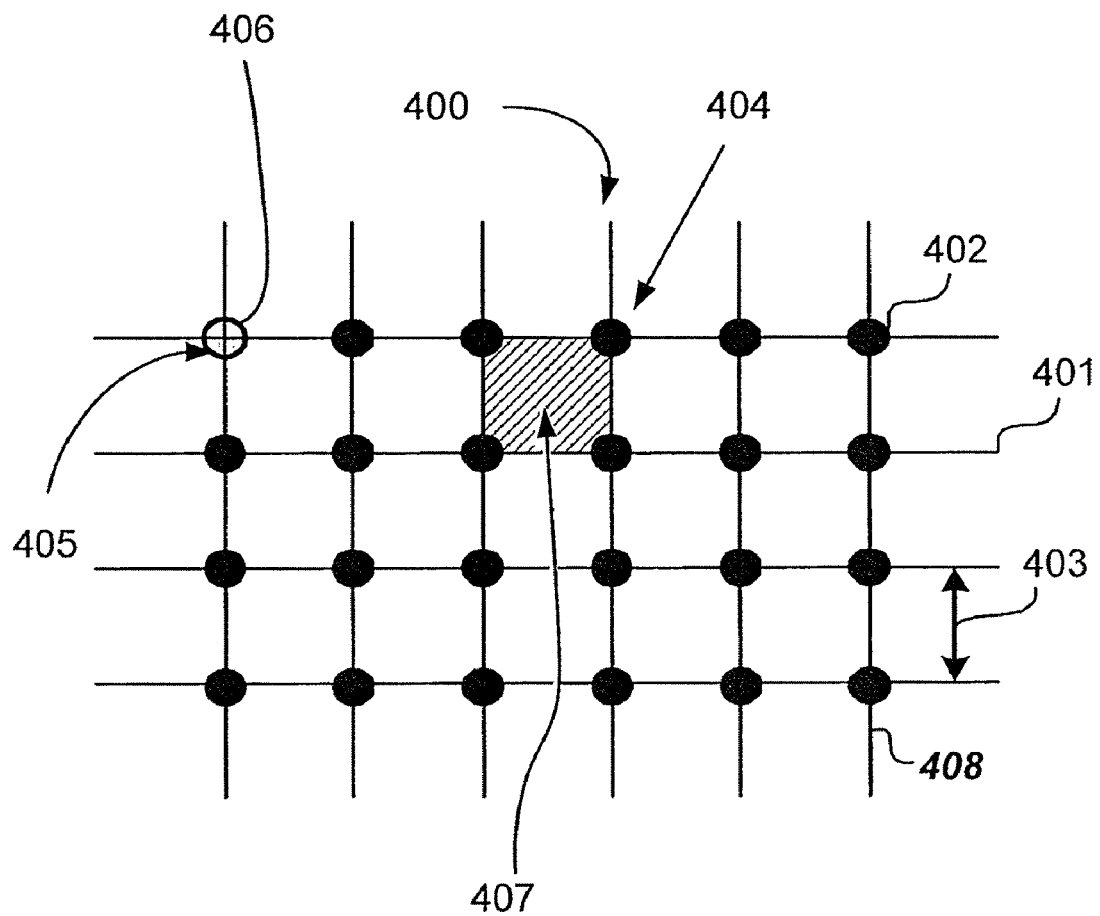
FIG. 4 shows the initial positions for the dots on a portion of the protected document.

FIG. 4 shows the initial (spatially unmodulated) positions for the protection dots on a portion of a protected document. In the described arrangement, these initial positions form an unmodulated array of protection dots associated with the intersection points 405 of a regular square grid 400. The term "square grid" relates to the shape 407 that is described by horizontal lines 401 and vertical lines 408 of the grid 400. The grid 400 has a pitch 403 that is typically in the order of 1 mm. While the described arrangements make use of rectangular, and preferably square, regular grid arrangements, other grid arrangements are possible. For example, grid arrangements having hexagonal or parallelogram grid shapes can be used. Furthermore, a grid formed by concentric circles and radii, which may be considered regular in terms of r and θ, can be used. What is required is that the grid intersection points (ie the positions upon which unmodulated protection marks are situated) be defined in a known manner, thereby forming a basis for determining the positions of modulated marks depending upon the type of encoding used. Accordingly, once the grid, or the manner in which the grid is formed, is known, then given the modulation scheme, the marks on an encoded document may be decoded.

Figure 17:
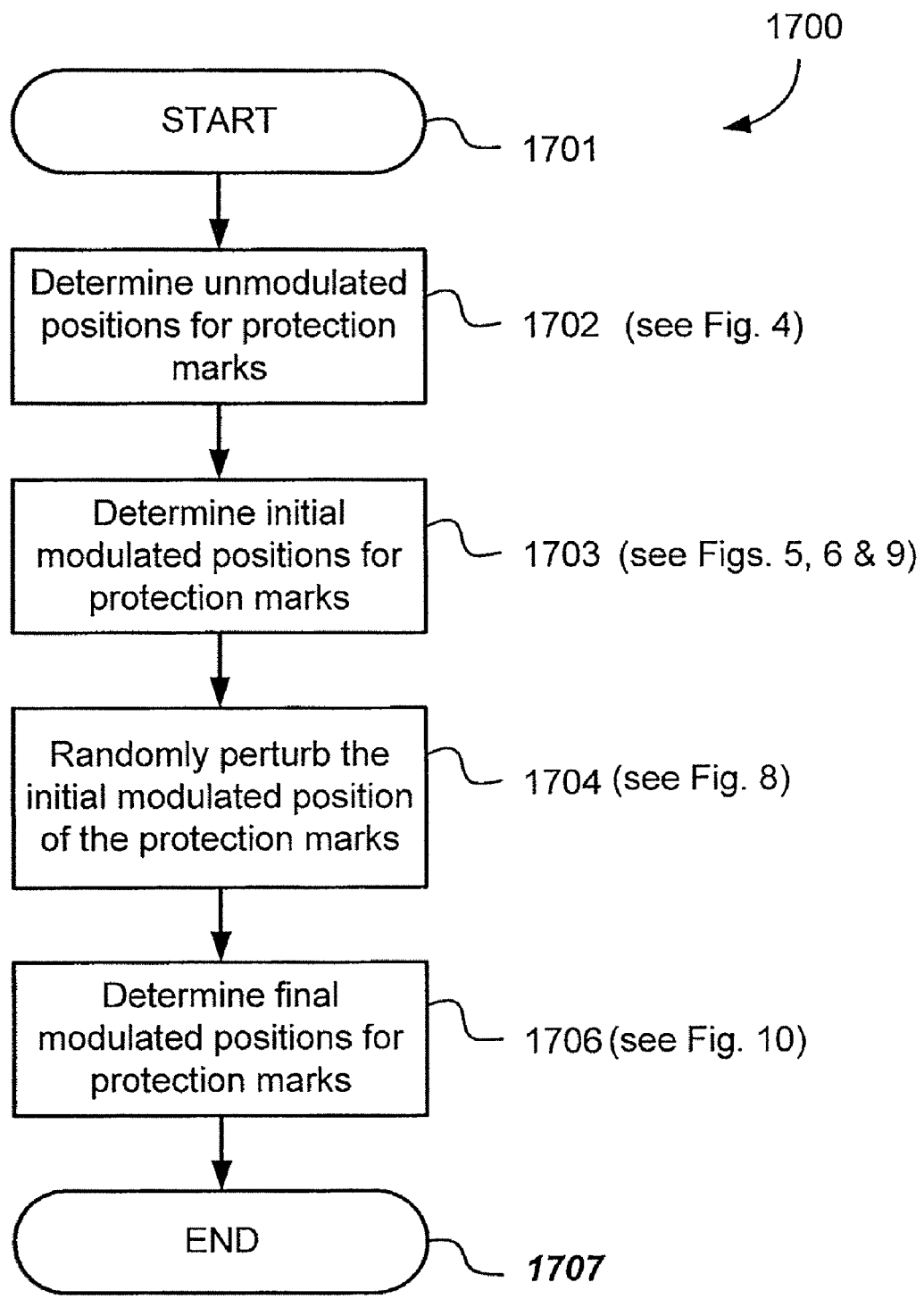
FIG. 17 is a flow chart of a process for generating a protected document.

FIG. 17 is a flow chart of a process 1700 for encoding and thus generating a protected document. The process 1700 commences with a start step 1701, after which a step 1702 determines the initial (ie spatially unmodulated) positions for the protection dots 402 in the array 404 of protection dots on the page in question in FIG. 4. In a subsequent step 1703, at least some of the dots 402 on the page are spatially modulated away from their starting positions. Spatial modulation, as described in more detail in regard to FIGS. 5 and 6, serves a number of purposes. One purpose is to make the dots (such as 302 in FIG. 3) less visible to a person than the (spatially unmodulated) protection dots 402 in FIG. 4. This is because the human visual system is very adept at noticing regular arrays. Another purpose of the spatial modulation is to enable unauthorised alteration (also referred to as tampering) of information printed on the document to be detected, through appropriately encoding the modulation of the protection dots 402. A following step 1704 randomly perturbs the modulated position of the protection marks, as described in more detail in regard to FIG. 8. Thereafter a step 1706 determines the subsequent modulation of the protection dots (this being the final modulation in the described example). This is described in more detail in regard to FIG. 10. The process 1700 then terminates at a STOP step 1707.

Figure 5:
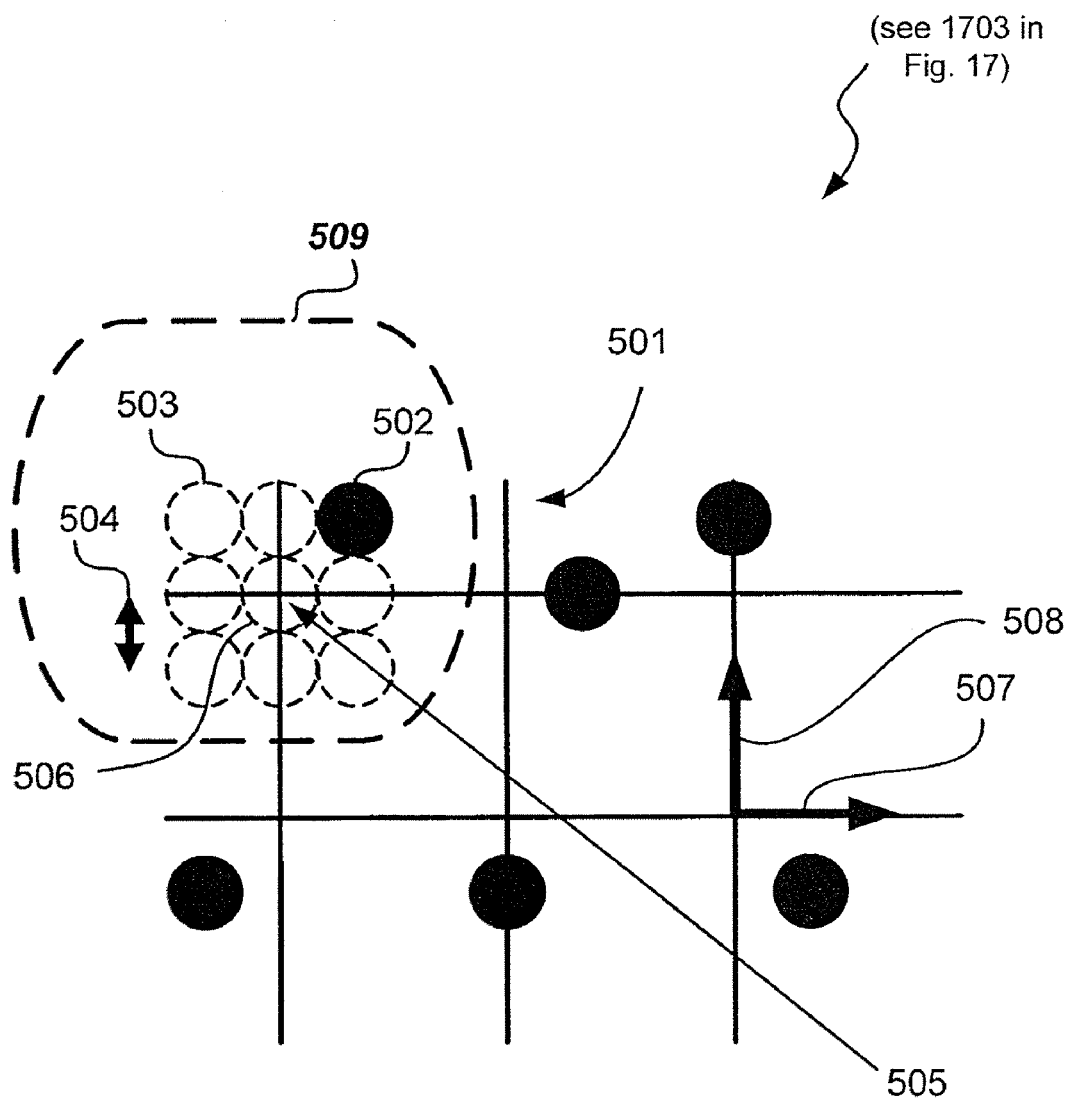
FIG. 5 shows the modulation of a dot.

FIG. 5 illustrates one example of modulation of the protection dots in greater detail. A spatially modulated protection dot 502 lies close to or upon an intersection point 505 of a regular grid 501. The dot 502 is spatially modulated to one of nine possible positions such as 503. The set of possible modulation positions is depicted by a dashed outline 509. The spatial modulation, performed by translating a protection dot 502 in a lateral (507) and transverse (508) direction relative to a corresponding intersection point 505, encodes data in the modulated protection dot.

The grid 501 is regular in the sense that it is definable and machine detectable and forms a set of reference locations (ie intersection points 505) in regard to which modulation may be imposed upon corresponding protection marks. As illustrated in the example of FIG. 5, the nine possible positions 509 for each protection dot are arranged in a three by three modulation position array centred on the corresponding grid intersection point 505. The central modulation position 506 of the three by three (3×3) array of modulation positions 509 is located at the grid intersection point 505, and corresponds to a modulation of zero distance horizontally (507) and zero distance vertically (508). The remaining eight modulation positions are offset from the grid intersection point 505 horizontally, vertically, or both horizontally and vertically.

The regular grid 501 may be conceptually viewed as a "carrier" signal for the modulated protection dots and, like a carrier wave in radio frequency communication, is not directly observable. The horizontal and vertical distance by which the modulation positions are offset from the grid intersection point 505 is referred to as a modulation quantum 504, herein abbreviated as "mq". The locations of the nine modulation positions 509 (ie quanta), relative to the corresponding grid intersection point 505, can be defined as a list of (x, y) vectors where x indicates the horizontal direction (507) and y indicates the vertical direction (508). Using the convention that rightward offsets (507) are positive with respect to x and downward offsets (ie opposite to 508) are positive with respect to y. The vectors are represented by the following:

(−mq, −mq),
(0, −mq),
(+mq, −mq),
(−mq, +0),
(0, +0),
(+mq, +0),
(−mq, +mq), (0, +mq), and
(+mq, +mq)

Figure 6:
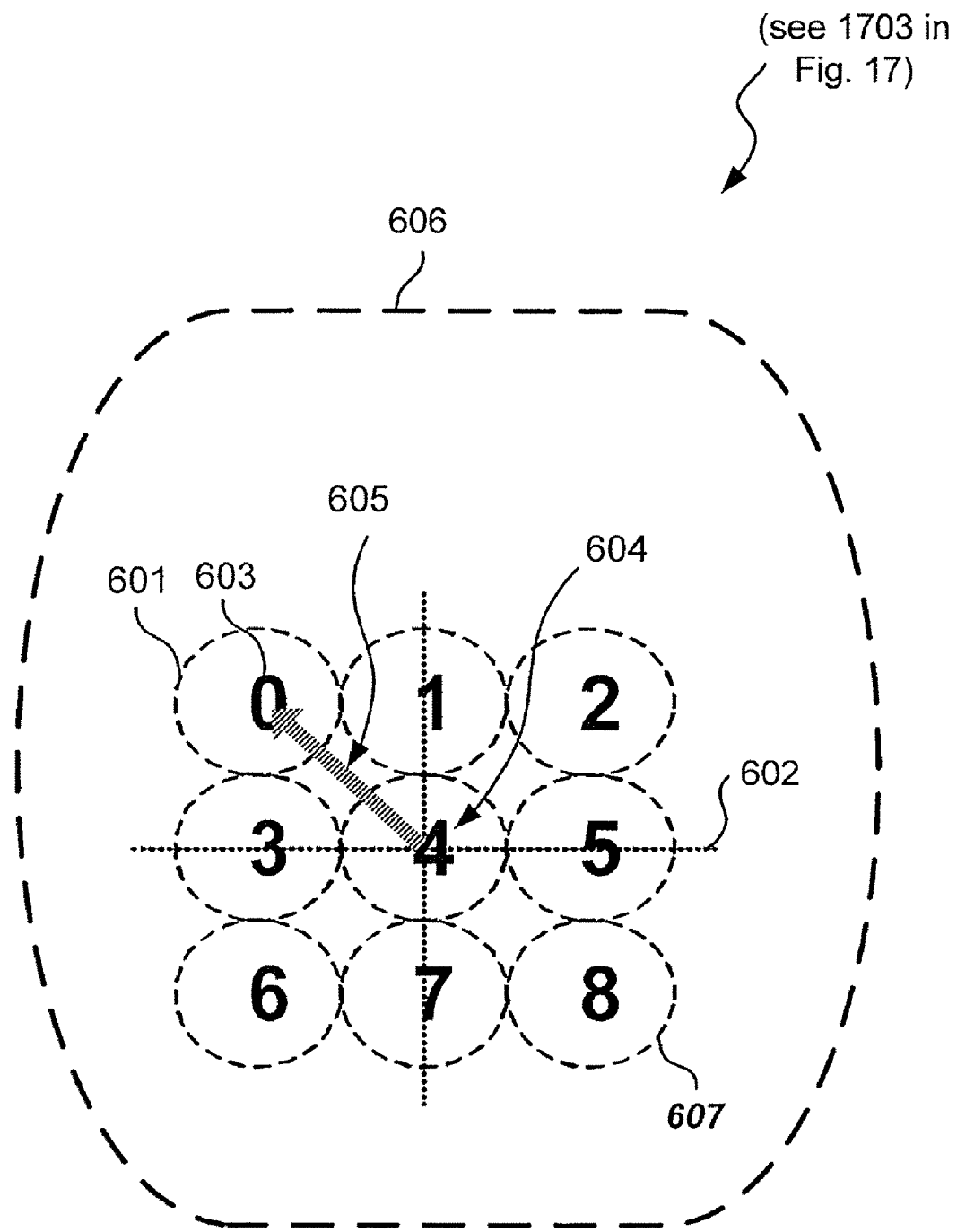
FIG. 6 shows the modulation of a dot in greater detail.

FIG. 6 shows dot modulation positions as depicted in of FIG. 5 in more detail. In FIG. 6, the set of modulation positions 606 is centred on a grid intersection point 604 of a grid 602. Each modulation position, such as position 601, has an associated digital code value 603. The digital code value 603 for the position 601 is "0". The nine modulation positions (including the modulation position 601) allow each dot to encode one of nine possible digital code values (including the value 603 for the position 601). Each modulation position may equivalently be represented as a vector 605.

Figure 7:
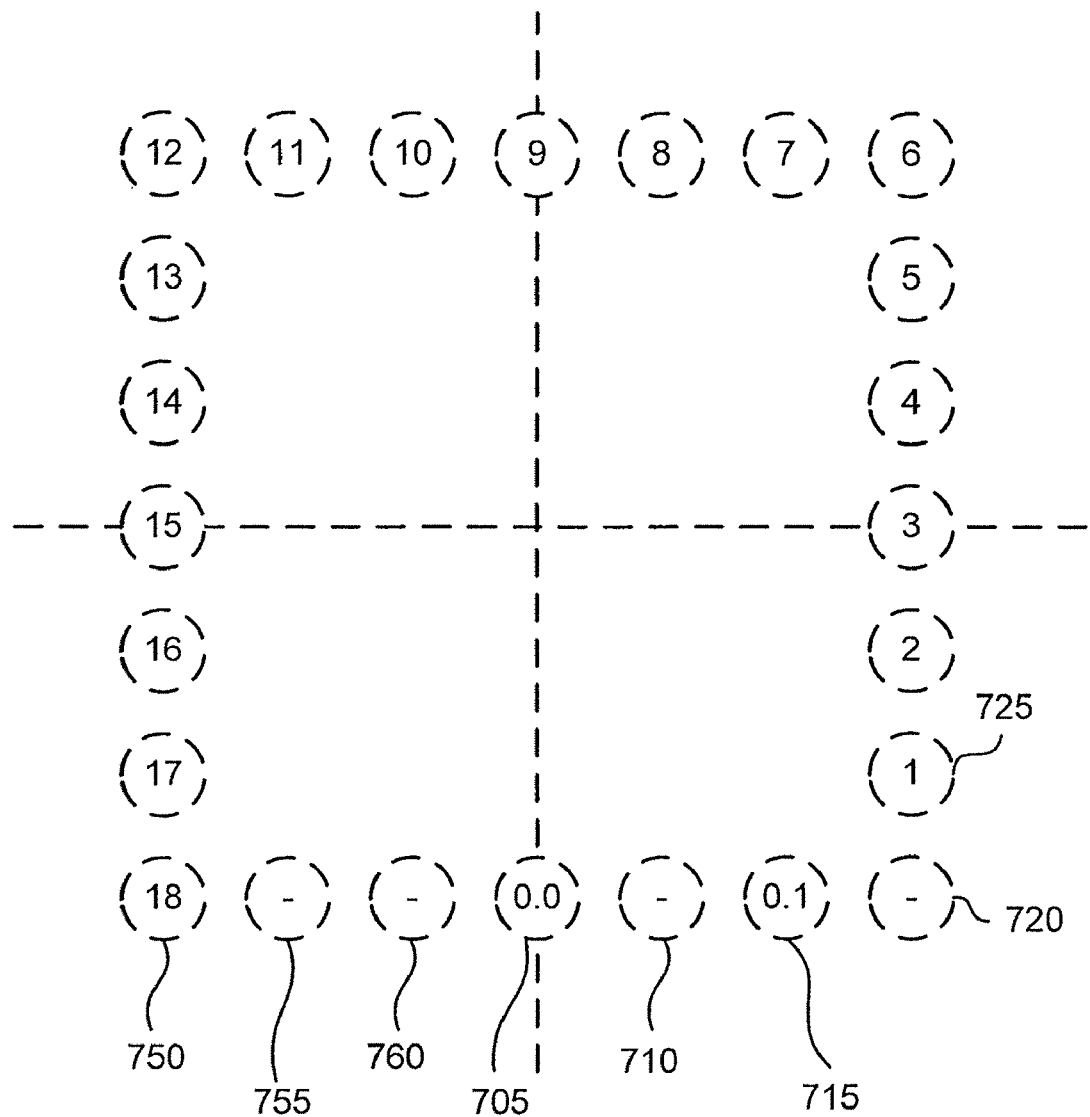
FIG. 7 shows an alternative modulation of a dot

The above described arrangement uses a base-nine modulation scheme with a three by three (3×3) array of modulation positions. Alternate modulation schemes with a smaller or larger number of modulation positions can be used. These alternate schemes can include base-4 (2×2), base-16 (4×4), base-25 (5×5), base-36 (6×6), base-49 (7×7), and so on. In another implementation, a base-8 scheme may be used where the central dot of the presently illustrated 3×3 arrangement 606 is omitted. Modulation schemes based upon rectangular grids can also be used. For example, base-6 (2×3), base-12 (3×4), base-20 (4×5), base-30 (5×6), and base-42 (6×7) may be used if desired. Modulation schemes of other shapes (e.g. circular) can also be used. Another alternative is shown in FIG. 7 where a base 19 system is used to encode data. In this arrangement 705 and 715 are both used to encode a value of zero. The values one 725 to eighteen 750 are encoded in an anticlockwise direction. The distance between some encoded values, such as zero 705 and eighteen 750, can be increased by not assigning values to positions 755 and 760. Similarly no value is assigned to positions 710 and 720.

Figure 9:
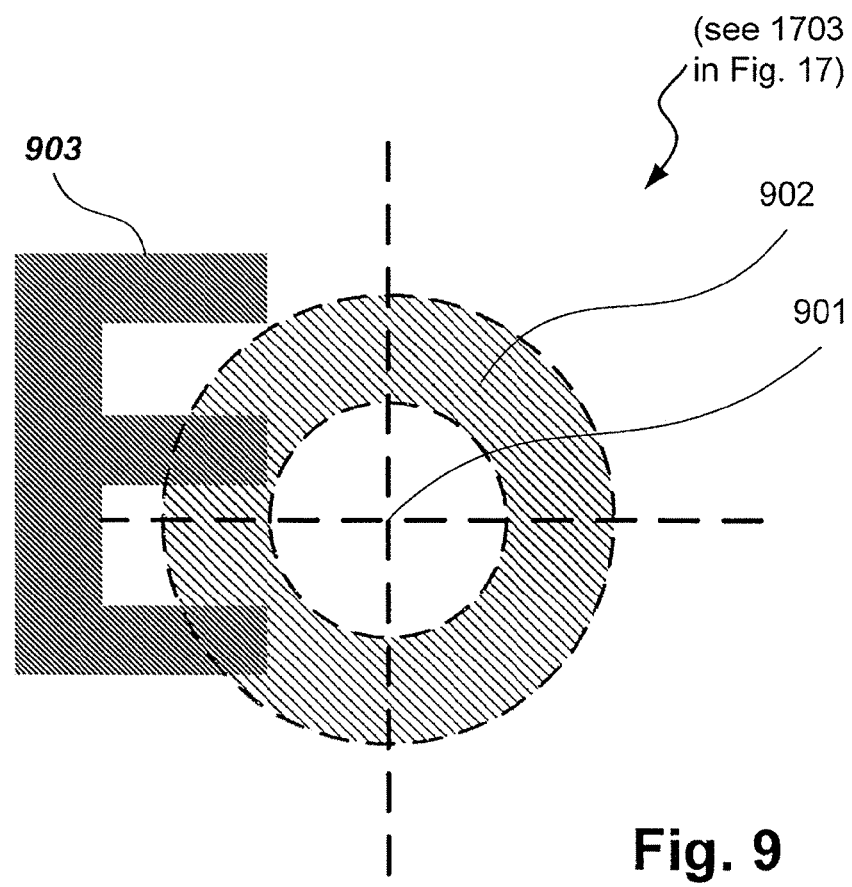
FIG. 9 shows the area used to calculate the average pixel intensity.

One modulation scheme based upon average intensity in an area of the document in question is now described in regard to FIG. 9.

FIG. 9 shows the area used to calculate the average pixel intensity. To determine which modulation position will be used for an individual protection dot 901, the document is first converted to a greyscale image. The greyscale bitmap image is then binarised to form a black and white image by first applying a filter function, such as a Gaussian blur, to the greyscale image. The greyscale image is then binarised, by applying a threshold function, to form a black and white image.

Then, the average pixel intensity of an annular area 902 around the initial protection dot position 901 is determined. Ideally the area 902 overlaps with corresponding areas associated with other protection dots. In the present example, the area 902 encompasses part of a letter 'E' 903. The pixel intensity that is determined for the area 902 is scaled, using a suitable scale factor, to one of the possible digital code values 603, in this case '2'.

In the present example the area 902 whose average pixel intensity is used to determine the modulation position of the protection dot 901 is effectively co-located with the corresponding protection dot 901. However, as foreshadowed in the "Summary" section which refers broadly to "corresponding areas of the unprotected document associated with the protection marks", the area need not be co-located with the corresponding protection dot.

In regard to the example in FIG. 9 the property of the unprotected document that is used to modulate an attribute of the protection dots is the average pixel intensity, and the area associated with the protection dot in question is the area 902. However other properties and other areas can also be used. For example, the area associated with the protection dot could be circular, square, or any shape, or the union of a plurality of small areas in any shape. Other properties which could be used include different statistical measures of the pixel intensity, e.g. the median, maximum or standard deviation. By using a Fourier transform of the associated area, other properties such as the median frequency, centroid or peak positions could be used. Another property which could be used is the average direction of the lines in the associated area.

Figure 8:
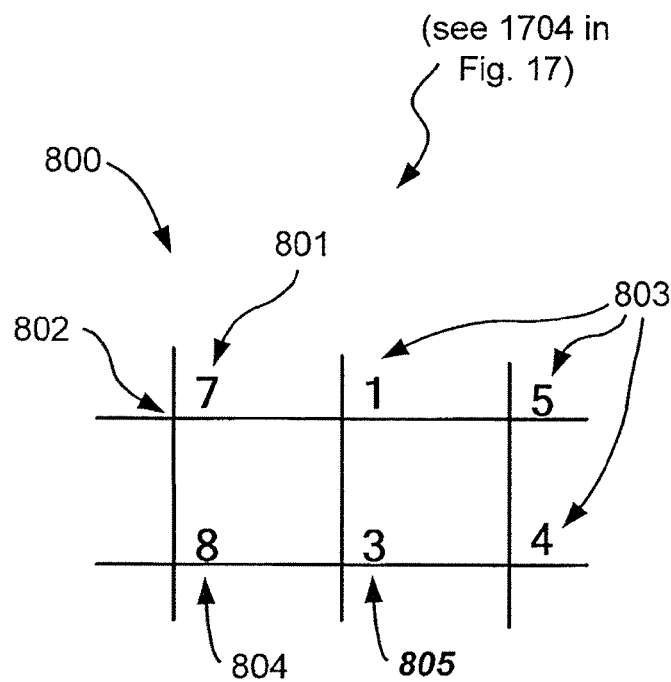
FIG. 8 shows the pseudo-random numbers used for encoding at each grid position.
Figure 10:
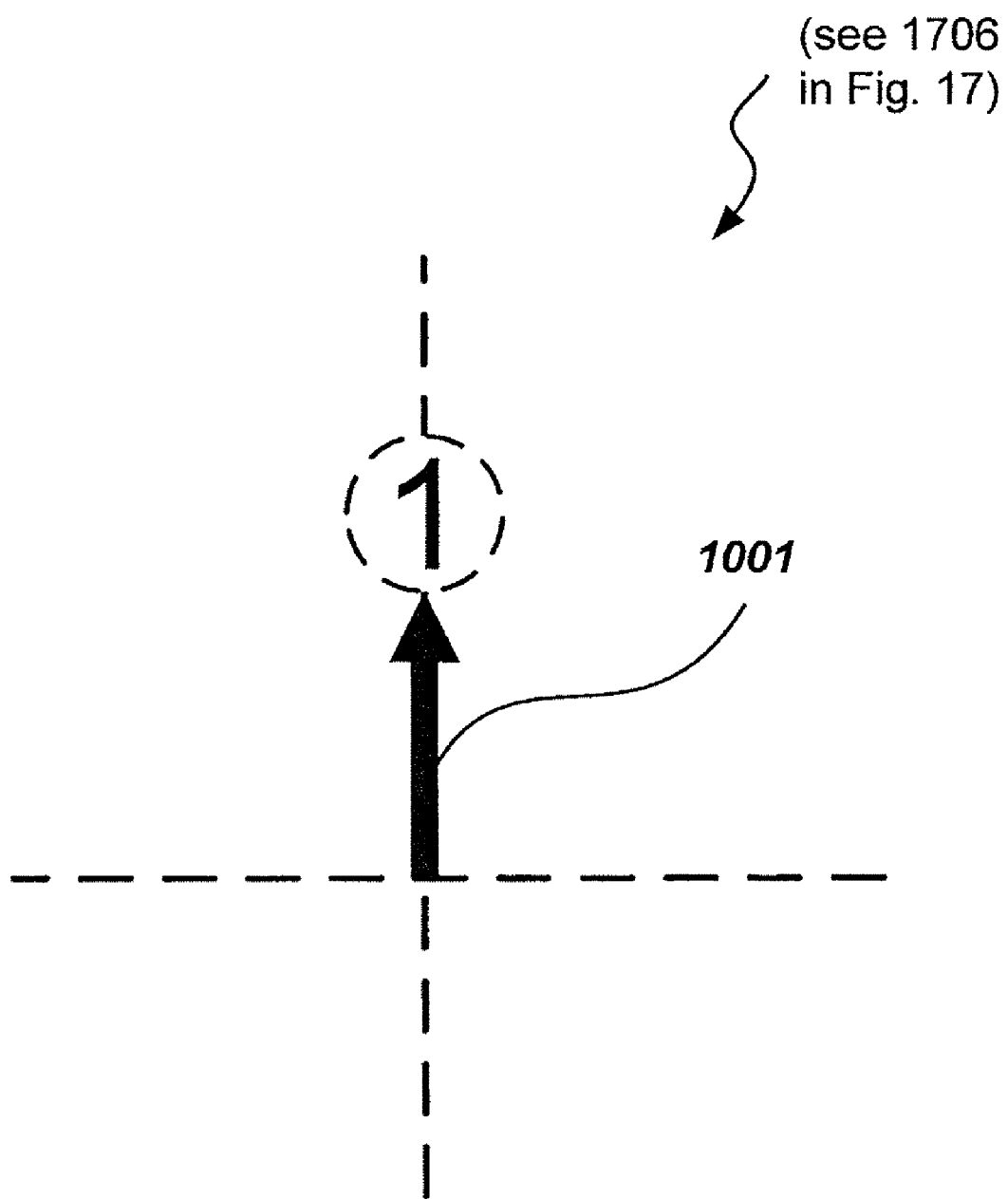
FIG. 10 shows the dot modulation resulting from the pixel intensity in FIG. 9.

FIG. 8 shows the pseudo-random numbers used for encoding the initially modulated protected dot position at each grid intersection point. A pseudo-random number 801 is assigned to each grid intersection point 802. This pseudo-random number is added to the digital code value associated with the modulated protection dot in order to produce an encrypted digital code value (subtracting 8 if the result is greater than 8). For example, if the digital code value is 2, and the pseudo-random number 7, then the encrypted code value would be 1 (2+7−8). This encrypted code value then determines the modulation 1001 for the protection dot, as shown in FIG. 10 (also see FIG. 6). The pseudo-random numbers associated with each grid intersection point of the grid are generated from a seed which is made known to a decoder which is to determine if the image in question has been altered in an unauthorised manner.

The use of pseudo-random numbers as described in relation to FIG. 8 serves a number of purposes. One purpose is to provide a reasonable degree of cryptographic security against an attacker as a different pseudo-random number is associated with each grid intersection point.

An ancillary capability of the disclosed MME arrangements is to embed ancillary binary data in addition to the information used to detect tampering. One method of doing so is to reserve some protection dots (e.g. every $10^{th}$ dot) to encode data. With the encoding scheme in FIG. 6, it is possible to encode a number from 0-8. This is roughly equivalent to 3 bits of data. This means the binary data can be split up into 3-bit blocks. The data can be repeated across the page, and error correction codes can be used to improve robustness. Thus, for example, consider an A4 page which is about 21 cm wide by 30 cm high, with 2.5 cm margins all round, and using a protection dot pitch of 1 mm. This provides a protection dot array 160 wide by 250 high, ie a total of 40,000 protection dots. If every $10^{th}$ dot is reserved for additional binary data (ie 4000 dots), and if data is repeated ten times for robustness (ie 400 sets of dots), then the capacity of the page for additional embedded data is approximately 3 times 400 ie 1200 bits.

Another method of embedding binary data is to reserve two modulation positions (eg modulation positions 601 and 606 in FIG. 6) for encoding a digital code value of 0. These two modulation positions both represent an average pixel intensity of 0, but they represent embedded data values of 0 and 1 respectively. The data to be embedded can then be split up into individual bits, and encoded into the dots. In this way, white areas of the page (those with digital code value 0) are used to encode the data. The data can be repeated across the page, and error correction codes used to improve robustness. This can be seen in FIG. 7 where positions 705 and 715 both encode average pixel intensity of 0 with position 705 encoding an embedded data value of 0 and position 715 encoding an embedded data value of 1.

Verifying a Protected Document

Verification of a protected document is performed by first obtaining a digital greyscale image of the document using a scanner 119 (see FIG. 1).

FIG. 11 depicts is a flow diagram showing a method 1100 for verifying (ie decoding) a protected document. The method 1100 is desirably performed as a software application executable within the PC 101 having input the protected document read via the scanner 119.

The method 1100 commences with a start step 1101, which accepts as input a scanned image of a protected document. In one arrangement, the scan takes the form of an 8 bit greyscale JPEG image scanned at 600 dpi. In a following step 1103, the protection dots on the scanned protected document are detected, and their positions on the page recorded in a list of coordinate data. The step 1103 may be performed using connected component analysis of the scanned image. In such analysis, individual pixels of the image are examined to connect and group those that are spatially adjacent. By analysing each group in terms of its shape, the presence of a mark (i.e. a circular dot or generally uniform blob of pixels of the appropriate expected size) can be detected. The centroid of the mark may then be determined to identify a coordinate location corresponding to the detected protection mark (protection dot).

In a subsequent step 1105 the list of dot coordinates obtained in the step 1103 is analysed to extract a description of the unmodulated array of protection dots, thereby detecting the regular grid that forms the carrier signal of the document protection. This process 1105 returns the pitch (gp 401), rotation angle and modulation quantum (mq 504) of the regular grid.

In the first instance, the step 1105 converts the supplied list of coordinate data into an array of coordinate data, as depicted by the array of protection dots 306 in FIG. 3.

The grid spacing (ie pitch) may be determined on the basis that the average spacing between the dots (eg the average of the lengths 307, 308 and 309 in FIG. 3) will equal the grid pitch (403 in FIG. 4). The grid orientation may be determined on the basis that the average direction between adjacent protection dots of the modulation grid (ie the array of modulated protection dots), being the directions of the arrows 307, 308 and 309 in FIG. 3, is aligned with the direction 310 of the vertical lines of the regular square grid (or 'carrier grid').

Another parameter which can be used to determine parameters of the modulated array of protection dots is the 'modulation quantum' (eg see 504 in FIG. 5). As previously noted in regard to FIG. 5, the term modulation quantum refers to the horizontal and vertical distance by which the modulation positions of the protection marks are offset from the corresponding carrier grid intersection point. In one arrangement described in relation to FIGS. 5 and 6, each protection dot is spatially modulated to one of nine possible positions arranged in a three by three array centred on a corresponding carrier grid intersection point. A central position of such a three by three array is located at the corresponding carrier grid intersection point, and corresponds to a modulation of zero distance horizontally and zero distance vertically. The remaining eight modulation positions are offset from the corresponding carrier grid intersection point.

In a following step 1107 the information stored in the position of each modulated protection dot is demodulated. Returning to FIG. 6, this is achieved by measuring the vector 605 that runs to each dot 601 from the nearest grid intersection point 604 of the regular grid 602. The nearest, or most proximate grid intersection point is determined by determining the minimum difference between the measured vector (between the computed grid intersection point and the detected protection dot) and the possible vectors (between the computed grid intersection point and the available modulation positions).

The measured vector is compared with the vectors from the intersection point 604 to the nine modulation positions showed in FIG. 6. In FIG. 6, the vector 605 extends from the point 604 to the modulation position 601. Similar vectors exist for each of the other modulation positions. The modulation position vector which correlates to or most closely matches the measured vector of the dot, is chosen as the correct position, and the corresponding digital data value, such as the value 603, is chosen as the correct data value for the dot. The closeness of match may be determined in a number of ways. One approach is to use a Euclidean comparison of vectors extending from the grid intersection position. For example, using the vectors V1(x1, y1) and V2(x2, y2), the minimum Euclidean distance off all possible nine vectors, in the described arrangement may be calculated using:

$$De = sqrt((x1-x2)^2 + (y1-y2)^2)$$

where:
x1, y1 are the coordinates of the located protection dot
x2, y2 are the coordinates of the modulated mark encoding position under consideration Alternatively, angles relative to the grid intersection point may be used if one assumes that where the angle is indeterminate due to the length of the vector being close to zero, the modulation degenerates to the grid intersection position. All of the protection dots returned by step 1105 are thus processed.

By this stage (ie the step 1107) the protected document has been decoded to the point where each grid intersection point is associated with a base-9 number.

A next step 1109 calculates the average pixel intensity in an area (eg 902 in FIG. 9) surrounding each grid intersection point of the protected document. Before calculating the average pixel intensity the scanned greyscale image is binarised to form a black and white image. First a filter function, such as a Gaussian blur, is applied to the greyscale image. Next the greyscale image is binarised, by applying a threshold function, to form a black and white image. This is the same process that is applied during the encoding process and is used to increase the similarity between the encoded image and the decoded image. The image binarisation process also removes the protection dots that were added during the encoding process.

Figure 12:
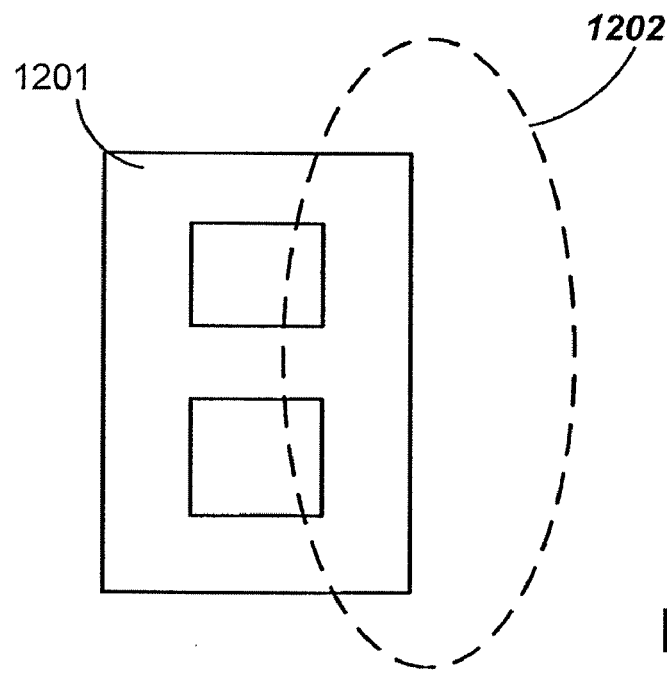
FIG. 12 shows a portion of a tampered document where an "E" has been changed to and "8"
Figure 13:
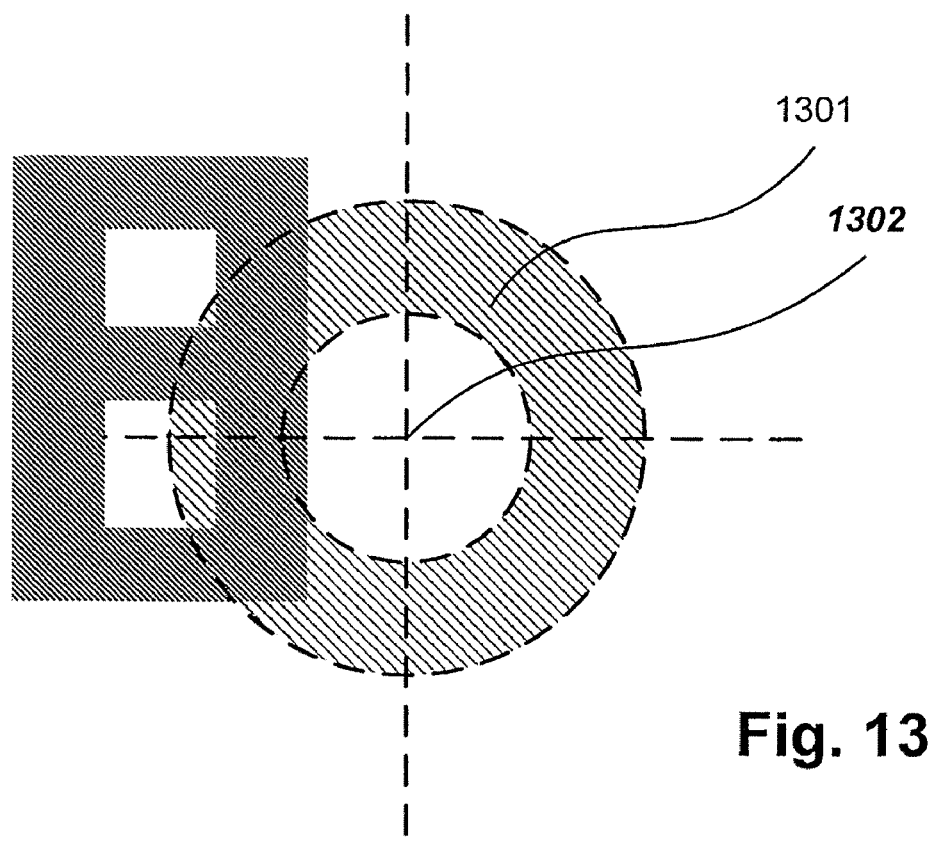
FIG. 13 shows the area used to calculate the average pixel intensity on the tampered document.

In FIG. 12 the character 'E' 903 From FIG. 9 has been tampered to form an '8' 1201. The tampered region is highlighted 1202. In FIG. 13 the average pixel intensity of the area 1301 around the grid intersection 1302 is measured.

Figure 14:
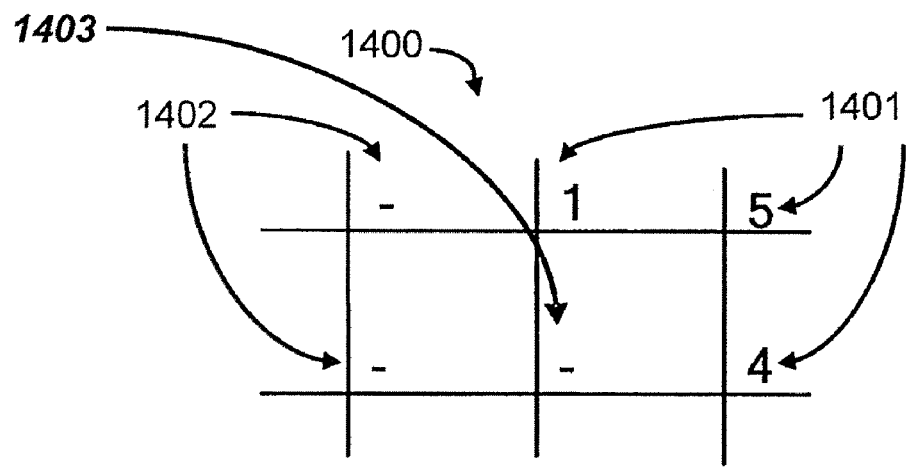
FIG. 14 shows the decoded values at grid values where the measured average pixel intensity was 0.

Step 1111 determines the pseudo-random number 801 (see FIG. 8) associated with each grid intersection point 802. In order to do this, all the grid intersection points examined in the step 1109 which have an average pixel intensity of 0 are considered. For example, suppose that in FIG. 14, the intersections 1401 are each found to have an average pixel intensity of 0. The decoded base-9 numbers for the intersections 1401 should match the pseudo-random numbers 803 used while encoding in FIG. 8. By knowing the pseudo-random numbers 803 used in the original grid 800 in FIG. 8, the decoded grid 1400 (in FIG. 14) can be aligned with the grid 800. One technique for doing this alignment is by treating the pseudo-random numbers in the grids as intensities in images. Standard techniques for image alignment can be used, such as phase correlation, to align the grids. Another technique for alignment is to take the pseudo-random numbers in all the rows of both grids, and append them together to create two strings of numbers. By searching for a fragment of one string in the other, the alignment can be found.

Once the grid 1400 (in FIG. 14) has been aligned with the grid 800 (in FIG. 8), the missing values 1402 and 1403 can be determined because they correspond to the values 801, 804 and 805.

A following step 1113 decodes the value associated with each grid modulated protection dot. This is done by taking the demodulated base-9 number determined in the step 1107, and subtracting the corresponding pseudo-random number determined in step 1111 (adding 8 if the result is less than 0). This results in a decoded value for each protection dot.

The decoded value for each protection dot calculated in the step 1113 can be compared to the average pixel intensity measured in the step 1109. However, the protected document may have undergone some processing (such as printing and scanning) which would give a systematic error for all the grid intersections. To overcome this, automatic calibration is conducted in a step 1115. For each possible decoded value (0-8 in the example described), every grid intersection with that decoded value is examined, and the mean of their average measured pixel intensity is calculated. A calibration map can be constructed from the decoded values and the means calculated. The calibration map thus constructed provides a mapping from each decoded value to a measured average pixel intensity. It is possible to use other statistical means to calculate the calibration map; for example by using the median values, or by plotting the values on a graph and using a line of best fit.

In a following step 1117, document tampering is detected. At each grid intersection point, the decoded value of the associated protection dot is mapped to an expected value using the calibration map constructed in step 1115. The difference is found between the expected value and the actual value measured in step 1109, giving an error at each grid intersection point. A greyscale bitmap image of the same size as the protected document is created to represent the tampering, with all pixels initialized to 0. Pixels in the aforementioned tamper image corresponding to each grid intersection point on the protected document are set to the error calculated for those intersections. A filter function (e.g. gaussian blur) is applied to the tamper image so that the pixels containing errors are spread into their local areas. Preferably this filter function is a similar shape and size to the area 902 (see FIG. 9) used while encoding the document.

Figure 15:
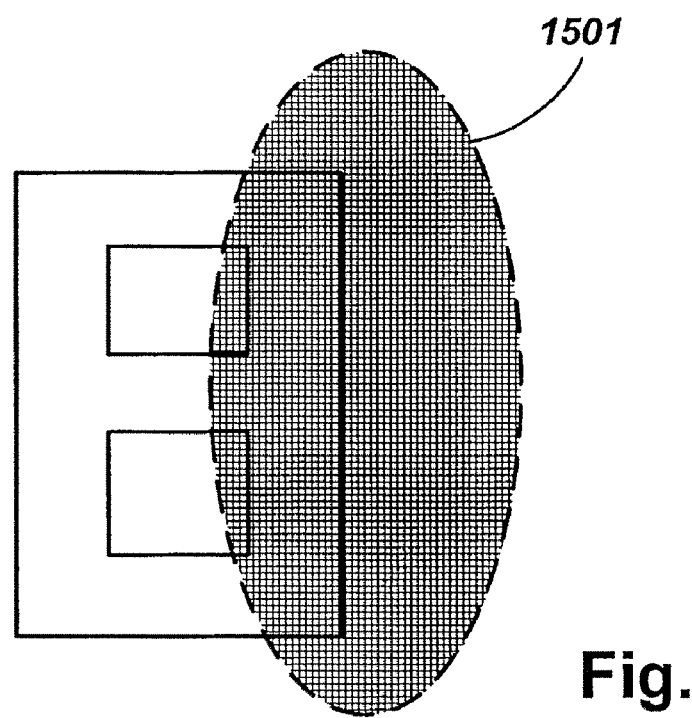
FIG. 15 shows the altered area highlighted on the tampered document.

At this stage the tamper image has areas of 0 intensity representing untampered areas, areas which have negative values representing areas where content has been deleted, and areas with positive values representing areas where content has been added. By choosing a threshold value greater than 0, and setting all pixels below this to a threshold representing white, and all pixels above this threshold to a value representing black, the tamper image will clearly display areas where content has been added. It is possible to superimpose the tamper image onto the protected content, ideally converted to a conspicuous colour. An example result is shown in FIG. 15, with the tampered region 1501 highlighted.

In a similar way, a negative threshold can be chosen, and all pixels below this threshold set to a value representing black, and all pixels above this threshold set to a value representing white. The tamper image will then clearly display areas where content has been deleted. This tamper image can also be superimposed onto the protected document, ideally converted to a conspicuous colour.

In a following step 1119, a "missing dots" image representing tampering is created by finding all the grid intersections where a dot could not be found or decoded. A greyscale bitmap image is created of the same size as the protected document where all the pixels are initialized to 0. Pixels corresponding to the grid intersections where dots are missing are set to a value higher than 0. Because it is expected that more dots will be missing in areas of high average pixel intensity (e.g. around text), the aforementioned value should be inversely proportional to the average pixel intensity. Next, a filter function (e.g. Gaussian blur) is applied to the missing dots image. A threshold is chosen, and all pixels above this threshold are set to a value representing black, and all pixels below this threshold are set to a value representing white. The missing dots image can also be superimposed onto the protected document, ideally converted to a conspicuous colour.

Ideally the aforementioned positive, negative & "missing dots" thresholds should be chosen interactively, e.g. by movable sliders on a graphical user interface. Modifying the values of the thresholds changes the sensitivity of the detection process.

Figure 16:
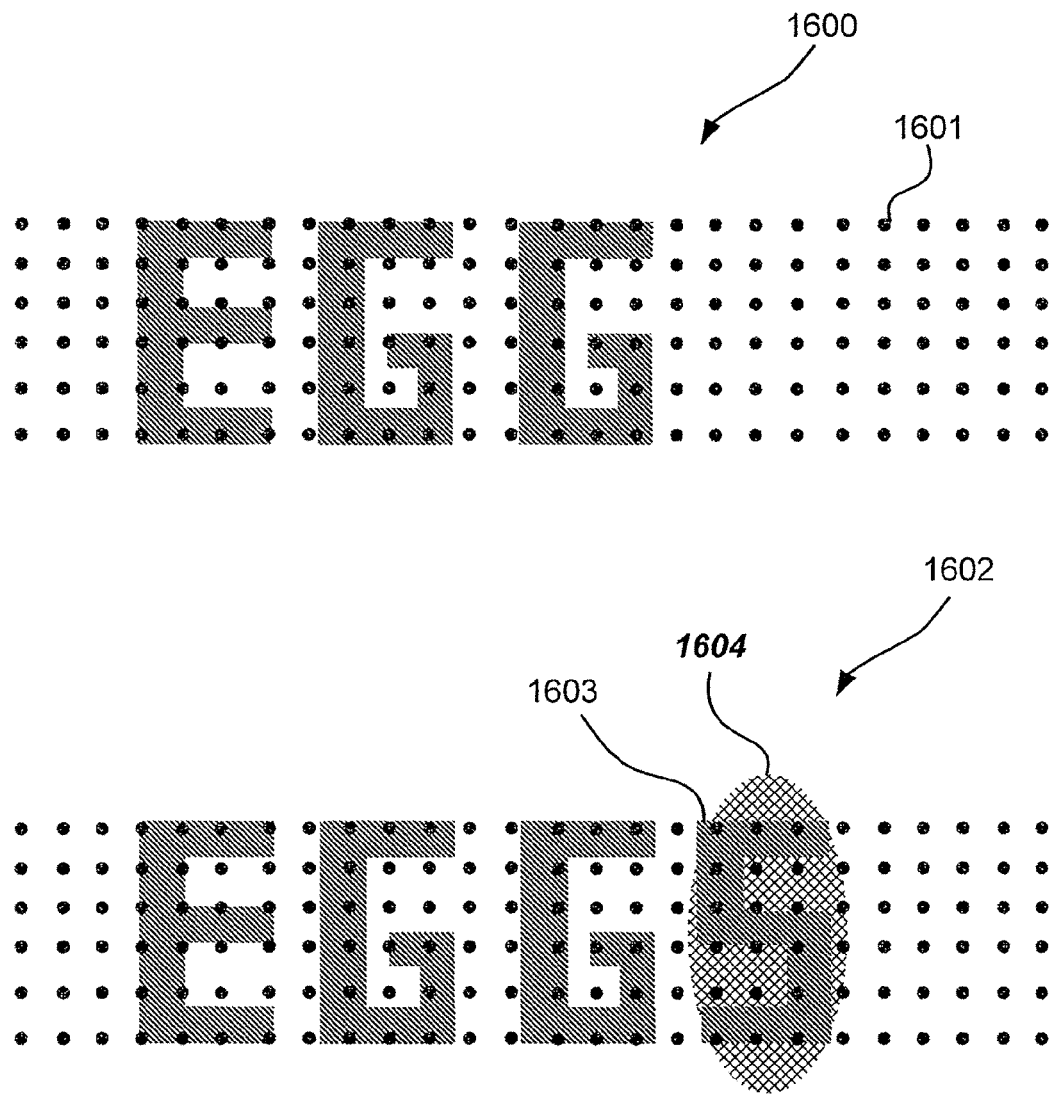
FIG. 16 depicts a protected document which has been altered in an unauthorised manner, after processing using the disclosed MME arrangements.

FIG. 16 depicts a protected document which has been altered in an unauthorised manner, after processing using the disclosed MME arrangements. A first view 1600 shows a fragment of a protected document upon which the word "EGG" and an associated array 1601 of protection dots has been printed. A second view 1602 shows the same document fragment after processing using the disclosed MME arrangements. In the second view, the word "EGG" has been amended, in an unauthorised manner, to read "EGGS". The unauthorised amendment (ie tampering) comprising the added letter "S" is clearly indicated by the highlighted area 1604 produced by the MME arrangements.

Figure 18:
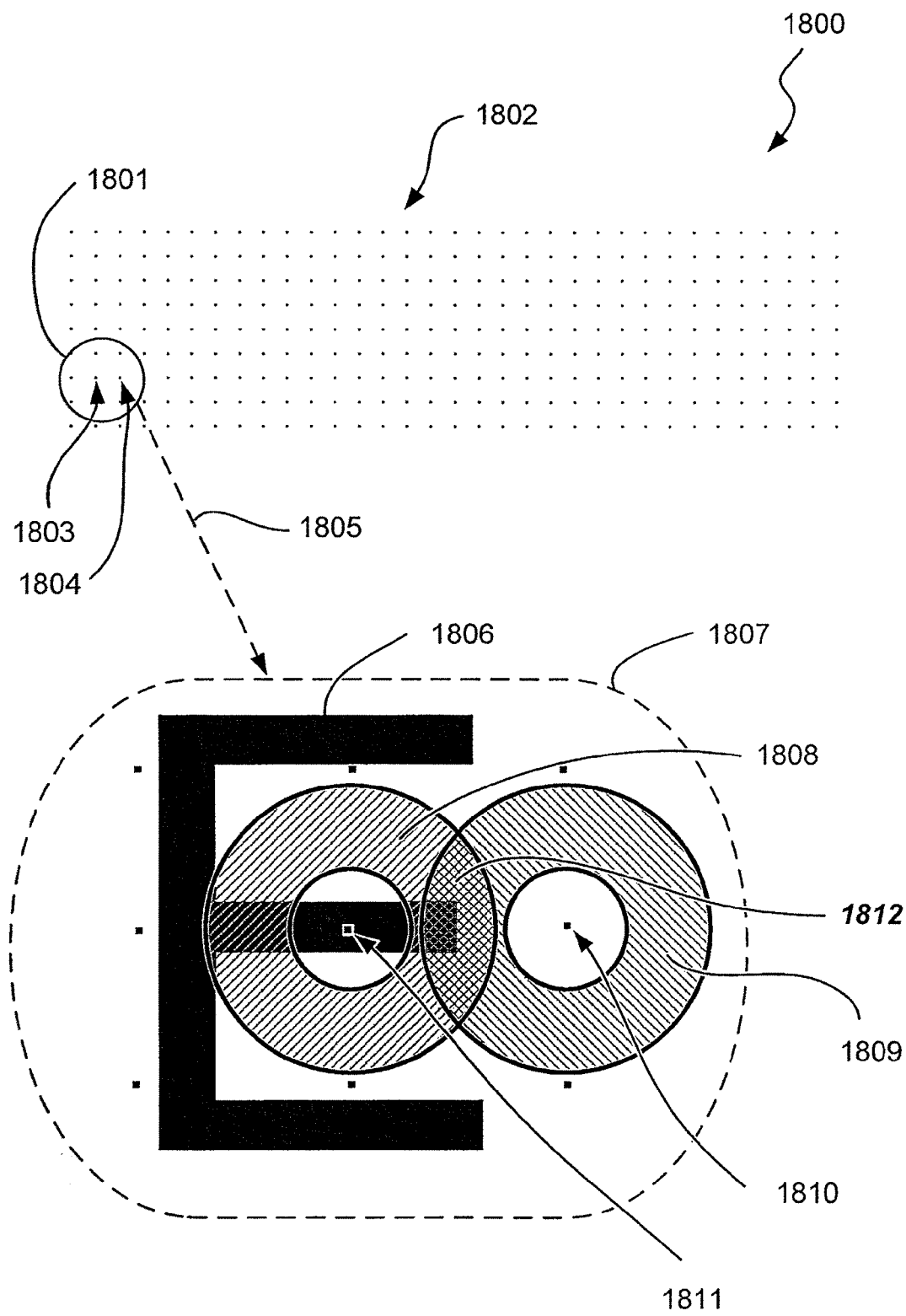
FIG. 18 depicts an MME example in which respective areas that are associated with corresponding protection marks partially overlap.

FIG. 18 depicts an MME example 1800 in which respective areas 1808 and 1809 that are associated with corresponding protection marks at grid positions 1811 and 1810 partially overlap in a region 1812.

A segment 1801 of a grid 1802 is shown, as depicted by a dashed arrow 1805, in enlarged form 1807. Grid positions 1803 and 1804 are in this manner depicted by corresponding grid positions 1811 and 1810. A capital letter "E" 1806 extends into the overlap area 1812.

Figure 19:
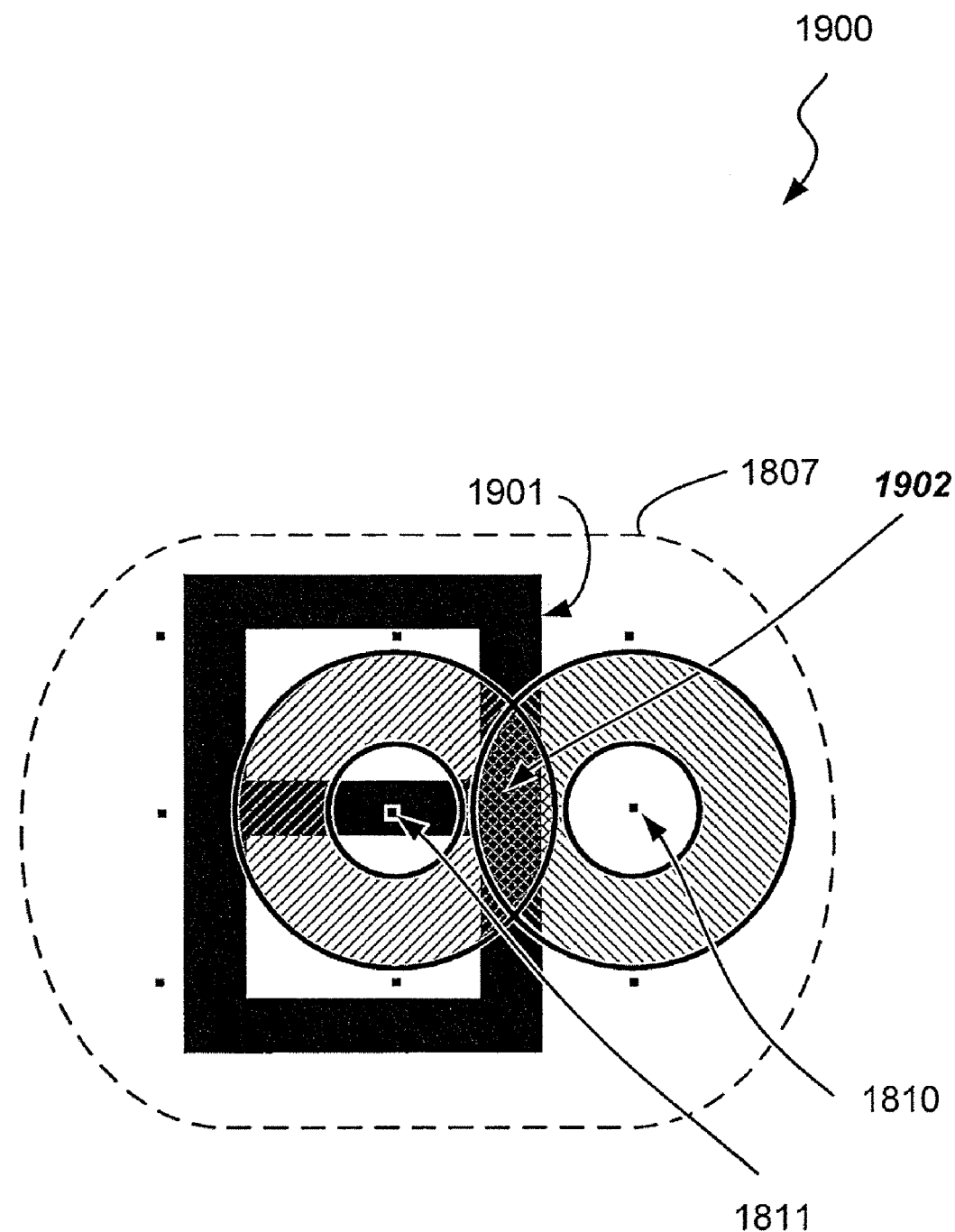
FIG. 19 depicts tampering in the example of FIG. 18.

As described in relation to FIG. 9, the spatially modulated position for the protection dot associated with the grid position 1811 is determined by determining the average pixel intensity in the annular region 1808. Similarly, the spatially modulated position for the protection dot associated with the grid position 1810 is determined by determining the average pixel intensity in the annular region 1809. Since the overlap area 1812 is common to the protection dots associated with both the grid position 1811 and the grid position 1810, any tampering with the letter "E" in the overlap area 1812 will be detected (see for example the step 1117 in FIG. 11) in relation to both protection dots. Thus for example if the letter "E" is changed to the numeral "8" as depicted in FIG. 19, the vertical line 1901 will change the average pixel intensity in the region 1902 which will impact on the step 1117 in FIG. 11 in relation to the protection dots at both the grid positions 1811 and 1810.

This overlapping arrangement has a number of advantages. One advantage is that if the document is soiled in the annular area surrounding the grid position 1811, then the annular area surrounding the grid position 1810 can still be used to detect the aforementioned tampering. Furthermore, if there is no soiling of the document then the availability of redundant information from both annular regions shown can in some cases provide greater sensitivity in detection of tampering. For example, in FIG. 18, when the letter "E" and the protection dot associated with the grid position 1811 overlap and the protection dot associated with the grid position 1811 cannot be detected, the detection of tampering in the overlap area 1812 can be detected by the protection dot associated with the grid position 1810.

In MME arrangements in which the areas associated with respective protection marks are collocated with their respective protection marks (as shown in the example of FIG. 9), then the overlap of the areas of different protection marks is typically partial as shown in FIG. 18. This means that only a part an area associated with a protection mark overlaps with the area associated with another protection mark. If however the areas associated with protection marks are not collocated with their respective protection marks, then in some cases the area associated with one protection mark can overlap completely with the area associated with another protection mark. Many of the advantages arising from overlap of the areas associated with the protection marks are realized in cases of both partial and complete overlap.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

The claims defining the invention are as follows:

1. A method of encoding an unprotected document to ensure that unauthorized changes to the unprotected document can be detected, the method comprising the steps of:
    defining an unmodulated array of protection marks associated with the unprotected document, and, for each protection mark in the array, modulating an attribute of the protection mark according to a property of information printed on the unprotected document in an area associated with the protection mark to thereby form a modulated protection mark, wherein:
    the area associated with the protection mark partially overlaps an area associated with another protection mark in the array, so that unauthorized changes to the document in the partially overlapping area associated with the protection mark and the other protection mark can be detected in relation to both the protection mark and the other protection mark; and
    incorporating the modulated protection marks into the unprotected document to thereby form a protected document.

2. The method of claim 1, comprising a further step of determining if unauthorized changes have been made to the protected document dependent upon a comparing step which comprises the steps of:
    determining the property of the protected document in the area associated with the modulated protection mark; and
    comparing the determined property of the unprotected document to the determined property of the protected document.

3. The method of claim 1, wherein the unmodulated array of protection dots is defined by the intersection points of a regular square grid.

4. The method of claim 1, wherein the attribute of the protection mark is the unmodulated position of the protection mark and the modulation is spatial modulation.

5. The method of claim 1, wherein the property of the unprotected document is the average intensity.

6. The method of claim 1, wherein the area associated with the protection mark is an annular area centered on the protection mark.

7. The method of claim 1, wherein the protection marks are visible to a person.

8. The method of claim 1, wherein ancillary data is incorporated into the protected document by at least one of:
    modulating some of the protection marks according to the ancillary information; and
    reserving some modulation quanta for modulating some of the protection marks according to the ancillary information.

9. A method of ensuring that unauthorized changes to an unprotected document can be detected, the method comprising an encoding process and a decoding process,
    wherein the encoding process comprises the steps of:
    (a) defining an unmodulated array of protection marks associated with the unprotected document, and, for each protection mark in the array, modulating an attribute of the protection mark according to a property of information printed on the unprotected document in an area associated with the protection mark to thereby form a modulated protection mark, wherein the area associated with the protection mark partially overlaps an area associated with another protection mark in the array, so that unauthorized changes to the document in the partially overlapping area associated with the protection mark and the other protection mark can be detected in relation to both the protection mark and the other protection mark; and
    (b) incorporating the modulated protection marks into the unprotected document to thereby form a protected document, and
    wherein the decoding process comprises the steps of:
    (a) extracting a description of the unmodulated array of protection marks from the protected document; and
    (b) identifying the modulated protection marks in the protected document, and, for each identified modulated protection mark,
        (1) demodulating the attribute of the modulated protection mark;
        (2) determining from the demodulated attribute the corresponding property of information printed on the unprotected document;
        (3) determining the property of information printed on the protected document in the area associated with the modulated protection mark; and
        (4) comparing the determined corresponding property of the information printed on the unprotected document to the determined property of the information printed on the protected document, wherein if the area associated with the identified modulated protection mark partially overlaps an area associated with another protection mark in the array, then the method comprises determining unauthorized changes to the protected document in the partial overlap area associated with the identified protection mark and the other protection mark by performing steps (1)-(4) in regard to both the identified protection mark and the other protection mark.

10. A method of detecting unauthorized changes to a protected document, the method comprising:
    extracting a description of an unmodulated array of protection marks from the protected document;
    identifying modulated protection marks in the protected document, and, for each identified modulated protection mark, (a) demodulating an attribute of the modulated protection mark;
(b) determining from the demodulated attribute a corresponding property of information printed on a corresponding unprotected document;
(c) determining the property of information printed on the protected document in an area associated with the modulated protection mark;
(d) comparing the determined corresponding property of the information printed on the unprotected document to the determined property of the information printed on the protected document; and
(e) determining if unauthorized changes have been made to the protected document dependent upon the comparing step, wherein if the area associated with the identified modulated protection mark partially overlaps an area associated with another protection mark in the array, then unauthorized changes to the protected document in the partial overlap area associated with the identified protection mark and the other protection mark can be determined by performing steps (a)-(e) in regard to both the protection mark and the other protection mark.

11. A system for ensuring that unauthorized changes to an unprotected document can be detected, the system comprising an encoding sub-system and a decoding sub-system, wherein the encoding sub-system comprises:
(a) a memory for storing a program; and
(b) a processor for executing the program, the program comprising:
  (1) code for defining an unmodulated array of protection marks associated with the unprotected document, and, for each protection mark in the array, for modulating an attribute of the protection mark according to a property of information printed on the unprotected document in an area associated with the protection mark to thereby form a modulated protection mark, wherein the area associated with the protection mark partially overlaps an area associated with another protection mark in the array, so that unauthorized changes to the document in the partially overlapping area associated with the protection mark and the other protection mark can be detected in relation to both the protection mark and the other protection mark; and
  (2) code for incorporating the modulated protection marks into the unprotected document to thereby form a protected document, and
wherein the decoding sub-system comprises:
(a) a memory for storing a program; and
(b) a processor for executing the program, the program comprising:
  (1) code for extracting a description of the unmodulated array of protection marks from the protected document;
  (2) code for identifying the modulated protection marks in the protected document, and, for each identified modulated protection mark,
    (i) for demodulating the attribute of the modulated protection mark;
    (ii) for determining from the demodulated attribute the corresponding property of information printed on the unprotected document;
    (iii) for determining the property of information printed on the protected document in the area associated with the modulated protection mark; and
    (iv) for comparing the determined corresponding property of the information printed on the unprotected document to the determined property of the information printed on the protected document, wherein if the area associated with the identified modulated protection mark partially overlaps an area associated with another protection mark in the array, then the program comprises code for determining unauthorized changes to the protected document in the partial overlap area associated with the identified protection mark and the other protection mark by performing steps (i)-(iv) in regard to both the identified protection mark and the other protection mark.

12. A encoding sub-system for a system for ensuring that unauthorized changes to an unprotected document can be detected, the system comprising an encoding sub-system and a decoding sub-system, wherein said encoding sub-system comprises:
(a) a memory for storing a program; and
(b) a processor for executing the program, the program comprising:
  (1) code for defining an unmodulated array of protection marks associated with the unprotected document, and, for each protection mark in the array, for modulating an attribute of the protection mark according to a property of information printed on the unprotected document in an area associated with the protection mark to thereby form a modulated protection mark, wherein the area associated with the protection mark partially overlaps an area associated with another protection mark in the array, so that unauthorized changes to the document in the partially overlapping area associated with the protection mark and the other protection mark can be detected in relation to both the protection mark and the other protection mark; and
  (2) code for incorporating the modulated protection marks into the unprotected document to thereby form a protected document.

13. A decoding sub-system for detecting unauthorized changes to a protected document, the sub-system comprising:
(a) a memory for storing a program; and
(b) a processor for executing the program, the program comprising:
  (1) code for extracting a description of an unmodulated array of protection marks from the protected document;
  (2) code for identifying modulated protection marks in the protected document, and, for each identified modulated protection mark,
    (i) for demodulating an attribute of the modulated protection mark;
    (ii) for determining from the demodulated attribute a corresponding property of information printed on a corresponding unprotected document;
    (iii) for determining the property of information printed on the protected document in an area associated with the modulated protection mark;
    (iv) for comparing the determined corresponding property of the information printed on the unprotected document to the determined property of the information printed on the protected document; and
    (v) for determining if unauthorized changes have been made to the protected document dependent upon the comparing step, wherein if the area associated with the identified modulated protection mark partially overlaps an area associated with another protection mark in the array, then the program comprises code for determining unauthorized changes to the protected document in the partial overlap area associated with the identified protection mark and the other protection mark by performing steps (i)-(v) in regard to both the identified protection mark and the other protection mark.

14. A computer readable medium having recorded thereon a computer program for directing a processor to execute a method for ensuring that unauthorized changes to an unprotected document can be detected, wherein the program comprises, in relation to an encoding sub-system:
(a) code for defining an unmodulated array of protection marks associated with the unprotected document, and, for each protection mark in the array, for modulating an attribute of the protection mark according to a property of information printed on the unprotected document in an area associated with the protection mark to thereby form a modulated protection mark, wherein the area associated with the protection mark partially overlaps an area associated with another protection mark in the array, so that unauthorized changes to the document in the partially overlapping area associated with the protection mark and the other protection mark can be detected in relation to both the protection mark and the other protection mark; and
(b) code for incorporating the modulated protection marks into the unprotected document to thereby form a protected document, and wherein the program comprises, in relation to a decoding sub-system:
(a) code for extracting a description of the unmodulated array of protection marks from the protected document;
(b) code for identifying the modulated protection marks in the protected document, and, for each identified modulated protection mark,
(1) for demodulating the attribute of the modulated protection mark;
(2) for determining from the demodulated attribute the corresponding property of information printed on the unprotected document;
(3) for determining the property of information printed on the protected document in the area associated with the modulated protection mark; and
(4) for comparing the determined corresponding property of the information printed on the unprotected document to the determined property of the information printed on the protected document, wherein if the area associated with the identified modulated protection mark partially overlaps an area associated with another protection mark in the array, then the program comprises code for determining unauthorized changes to the protected document in the partial overlap area associated with the identified protection mark and the other protection mark by performing the steps (1)-(4) in regard to both the protection mark and the other protection mark.

15. A computer readable medium having recorded thereon a computer program for directing a processor to execute an encoding method for ensuring that unauthorized changes to an unprotected document can be detected, the program comprising:
(a) code for defining an unmodulated array of protection marks associated with the unprotected document, and, for each protection mark in the array, for modulating an attribute of the protection mark according to a property of information printed on the unprotected document in an area associated with the protection mark to thereby form a modulated protection mark, wherein the area associated with the protection mark partially overlaps an area associated with another protection mark in the array, so that unauthorized changes to the document in the partially overlapping area associated with the protection mark and the other protection mark can be detected in relation to both the protection mark and the other protection mark; and
(b) code for incorporating the modulated protection marks into the unprotected document to thereby form a protected document.

16. A computer readable medium having recorded thereon a computer program for directing a processor to execute a decoding method for ensuring that unauthorized changes to an unprotected document can be detected, the program comprising:
code for extracting a description of an unmodulated array of protection marks from the protected document; and
code for identifying modulated protection marks in the protected document, and, for each identified modulated protection mark,
(a) for demodulating an attribute of the modulated protection mark;
(b) for determining from the demodulated attribute a corresponding property of information printed on a corresponding unprotected document;
(c) for determining the property of information printed on the protected document in an area associated with the modulated protection mark;
(d) for comparing the determined corresponding property of the information printed on the unprotected document to the determined property of the information printed on the protected document; and
(e) for determining if unauthorized changes have been made to the protected document dependent upon the comparing step, wherein if the area associated with the identified modulated protection mark partially overlaps an area associated with another protection mark in the array, then unauthorized changes to the protected document in the partial overlap area associated with the identified protection mark and the other protection mark can be determined by performing steps (a)-(e) in regard to both the protection mark and the other protection mark.

17. A method of generating a protected document containing information and data printed on the document, the data being encoded in a plurality of marks, the method comprising the steps of:
identifying a location on the grid for encoding data;
associating an area of the document with the location, the area comprising at least a portion of the information, the area partially overlapping an area associated with another location on the grid;
determining a parameter based on a property of the information printed on the area of the document; and
encoding the determined parameter at the location using a modulated mark to thereby form a protected document, wherein unauthorized changes to the document in the partially overlapping area associated with the location on the grid and the other location on the grid can be detected in relation to both the location on the grid and the other location on the grid.

* * * * *